US008922544B2

(12) United States Patent
Chaji et al.

(10) Patent No.: US 8,922,544 B2
(45) Date of Patent: Dec. 30, 2014

(54) DISPLAY SYSTEMS WITH COMPENSATION FOR LINE PROPAGATION DELAY

(71) Applicant: Ignis Innovation Inc., Waterloo (CA)

(72) Inventors: Gholamreza Chaji, Waterloo (CA); Yaser Azizi, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 107 days.

(21) Appl. No.: 13/800,153

(22) Filed: Mar. 13, 2013

(65) Prior Publication Data

US 2013/0314394 A1 Nov. 28, 2013

Related U.S. Application Data

(60) Provisional application No. 61/650,996, filed on May 23, 2012, provisional application No. 61/659,399, filed on Jun. 13, 2012.

(51) Int. Cl.

| | |
|---|---|
| ***G06F 3/038*** | (2013.01) |
| ***G09G 3/00*** | (2006.01) |
| ***G09G 3/32*** | (2006.01) |

(52) U.S. Cl.

CPC .. *G09G 3/00* (2013.01); *G09G 3/32* (2013.01); *G09G 3/3225* (2013.01); *G09G 2320/0223* (2013.01); *G09G 2320/045* (2013.01); *G09G 2320/0693* (2013.01)

USPC ............... 345/212; 345/214; 345/29; 345/20; 345/52

(58) Field of Classification Search

None

See application file for complete search history.

(56) References Cited

U.S. PATENT DOCUMENTS

| | | | |
|---|---|---|---|
| 3,506,851 | A | 4/1970 | Polkinghorn et al. |
| 3,774,055 | A | 11/1973 | Bapat |
| 4,090,096 | A | 5/1978 | Nagami |
| 4,160,934 | A | 7/1979 | Kirsch |
| 4,354,162 | A | 10/1982 | Wright |
| 4,943,956 | A | 7/1990 | Noro |
| 4,996,523 | A | 2/1991 | Bell et al. |
| 5,153,420 | A | 10/1992 | Hack et al. |
| 5,198,803 | A | 3/1993 | Shie et al. |
| 5,204,661 | A | 4/1993 | Hack et al. |
| 5,266,515 | A | 11/1993 | Robb et al. |
| 5,489,918 | A | 2/1996 | Mosier |
| 5,498,880 | A | 3/1996 | Lee et al. |
| 5,572,444 | A | 11/1996 | Lentz et al. |

(Continued)

FOREIGN PATENT DOCUMENTS

| | | |
|---|---|---|
| CA | 1 294 034 | 1/1992 |
| CA | 2 109 951 | 11/1992 |

(Continued)

OTHER PUBLICATIONS

Ahnood et al.: "Effect of threshold voltage instability on field effect mobility in thin film transistors deduced from constant current measurements"; dated Aug. 2009.

(Continued)

*Primary Examiner* — Muhammad N Edun

(74) *Attorney, Agent, or Firm* — Nixon Peabody LLP

(57) ABSTRACT

A method for characterizing and eliminating the effect of propagation delay on data and monitor lines of AMOLED panels is introduced. A similar technique may be utilized to cancel the effect of incomplete settling of select lines that control the write and read switches of pixels on a row.

12 Claims, 9 Drawing Sheets

(56) References Cited

U.S. PATENT DOCUMENTS

| | | | |
|---|---|---|---|
| 5,589,847 | A | 12/1996 | Lewis |
| 5,619,033 | A | 4/1997 | Weisfield |
| 5,648,276 | A | 7/1997 | Hara et al. |
| 5,670,973 | A | 9/1997 | Bassetti et al. |
| 5,691,783 | A | 11/1997 | Numao et al. |
| 5,714,968 | A | 2/1998 | Ikeda |
| 5,723,950 | A | 3/1998 | Wei et al. |
| 5,744,824 | A | 4/1998 | Kousai et al. |
| 5,745,660 | A | 4/1998 | Kolpatzik et al. |
| 5,748,160 | A | 5/1998 | Shieh et al. |
| 5,815,303 | A | 9/1998 | Berlin |
| 5,870,071 | A | 2/1999 | Kawahata |
| 5,874,803 | A | 2/1999 | Garbuzov et al. |
| 5,880,582 | A | 3/1999 | Sawada |
| 5,903,248 | A | 5/1999 | Irwin |
| 5,917,280 | A | 6/1999 | Burrows et al. |
| 5,923,794 | A | 7/1999 | McGrath et al. |
| 5,945,972 | A | 8/1999 | Okumura et al. |
| 5,949,398 | A | 9/1999 | Kim |
| 5,952,789 | A | 9/1999 | Stewart et al. |
| 5,952,991 | A | 9/1999 | Akiyama et al. |
| 5,982,104 | A | 11/1999 | Sasaki et al. |
| 5,990,629 | A | 11/1999 | Yamada et al. |
| 6,023,259 | A | 2/2000 | Howard et al. |
| 6,069,365 | A | 5/2000 | Chow et al. |
| 6,091,203 | A | 7/2000 | Kawashima et al. |
| 6,097,360 | A | 8/2000 | Holloman |
| 6,144,222 | A | 11/2000 | Ho |
| 6,177,915 | B1 | 1/2001 | Beeteson et al. |
| 6,229,506 | B1 | 5/2001 | Dawson et al. |
| 6,229,508 | B1 | 5/2001 | Kane |
| 6,246,180 | B1 | 6/2001 | Nishigaki |
| 6,252,248 | B1 | 6/2001 | Sano et al. |
| 6,259,424 | B1 | 7/2001 | Kurogane |
| 6,262,589 | B1 | 7/2001 | Tamukai |
| 6,271,825 | B1 | 8/2001 | Greene et al. |
| 6,288,696 | B1 | 9/2001 | Holloman |
| 6,304,039 | B1 | 10/2001 | Appelberg et al. |
| 6,307,322 | B1 | 10/2001 | Dawson et al. |
| 6,310,962 | B1 | 10/2001 | Chung et al. |
| 6,320,325 | B1 | 11/2001 | Cok et al. |
| 6,323,631 | B1 | 11/2001 | Juang |
| 6,356,029 | B1 | 3/2002 | Hunter |
| 6,373,454 | B1 | 4/2002 | Knapp et al. |
| 6,392,617 | B1 | 5/2002 | Gleason |
| 6,414,661 | B1 | 7/2002 | Shen et al. |
| 6,417,825 | B1 | 7/2002 | Stewart et al. |
| 6,433,488 | B1 | 8/2002 | Bu |
| 6,437,106 | B1 | 8/2002 | Stoner et al. |
| 6,445,369 | B1 | 9/2002 | Yang et al. |
| 6,475,845 | B2 | 11/2002 | Kimura |
| 6,501,098 | B2 | 12/2002 | Yamazaki |
| 6,501,466 | B1 | 12/2002 | Yamagishi et al. |
| 6,522,315 | B2 | 2/2003 | Ozawa et al. |
| 6,525,683 | B1 | 2/2003 | Gu |
| 6,531,827 | B2 | 3/2003 | Kawashima |
| 6,542,138 | B1 | 4/2003 | Shannon et al. |
| 6,580,408 | B1 | 6/2003 | Bae et al. |
| 6,580,657 | B2 | 6/2003 | Sanford et al. |
| 6,583,398 | B2 | 6/2003 | Harkin |
| 6,583,775 | B1 | 6/2003 | Sekiya et al. |
| 6,594,606 | B2 | 7/2003 | Everitt |
| 6,618,030 | B2 | 9/2003 | Kane et al. |
| 6,639,244 | B1 | 10/2003 | Yamazaki et al. |
| 6,668,645 | B1 | 12/2003 | Gilmour et al. |
| 6,677,713 | B1 | 1/2004 | Sung |
| 6,680,580 | B1 | 1/2004 | Sung |
| 6,687,266 | B1 | 2/2004 | Ma et al. |
| 6,690,000 | B1 | 2/2004 | Muramatsu et al. |
| 6,690,344 | B1 | 2/2004 | Takeuchi et al. |
| 6,693,388 | B2 | 2/2004 | Oomura |
| 6,693,610 | B2 | 2/2004 | Shannon et al. |
| 6,697,057 | B2 | 2/2004 | Koyama et al. |
| 6,720,942 | B2 | 4/2004 | Lee et al. |
| 6,724,151 | B2 | 4/2004 | Yoo |
| 6,734,636 | B2 | 5/2004 | Sanford et al. |
| 6,738,034 | B2 | 5/2004 | Kaneko et al. |
| 6,738,035 | B1 | 5/2004 | Fan |
| 6,753,655 | B2 | 6/2004 | Shih et al. |
| 6,753,834 | B2 | 6/2004 | Mikami et al. |
| 6,756,741 | B2 | 6/2004 | Li |
| 6,756,952 | B1 | 6/2004 | Decaux et al. |
| 6,756,958 | B2 | 6/2004 | Furuhashi et al. |
| 6,771,028 | B1 | 8/2004 | Winters |
| 6,777,712 | B2 | 8/2004 | Sanford et al. |
| 6,777,888 | B2 | 8/2004 | Kondo |
| 6,781,567 | B2 | 8/2004 | Kimura |
| 6,806,497 | B2 | 10/2004 | Jo |
| 6,806,638 | B2 | 10/2004 | Lih et al. |
| 6,806,857 | B2 | 10/2004 | Sempel et al. |
| 6,809,706 | B2 | 10/2004 | Shimoda |
| 6,815,975 | B2 | 11/2004 | Nara et al. |
| 6,828,950 | B2 | 12/2004 | Koyama |
| 6,853,371 | B2 | 2/2005 | Miyajima et al. |
| 6,859,193 | B1 | 2/2005 | Yumoto |
| 6,873,117 | B2 | 3/2005 | Ishizuka |
| 6,876,346 | B2 | 4/2005 | Anzai et al. |
| 6,885,356 | B2 | 4/2005 | Hashimoto |
| 6,900,485 | B2 | 5/2005 | Lee |
| 6,903,734 | B2 | 6/2005 | Eu |
| 6,909,243 | B2 | 6/2005 | Inukai |
| 6,909,419 | B2 | 6/2005 | Zavracky et al. |
| 6,911,960 | B1 | 6/2005 | Yokoyama |
| 6,911,964 | B2 | 6/2005 | Lee et al. |
| 6,914,448 | B2 | 7/2005 | Jinno |
| 6,919,871 | B2 | 7/2005 | Kwon |
| 6,924,602 | B2 | 8/2005 | Komiya |
| 6,937,215 | B2 | 8/2005 | Lo |
| 6,937,220 | B2 | 8/2005 | Kitaura et al. |
| 6,940,214 | B1 | 9/2005 | Komiya et al. |
| 6,943,500 | B2 | 9/2005 | LeChevalier |
| 6,947,022 | B2 | 9/2005 | McCartney |
| 6,954,194 | B2 | 10/2005 | Matsumoto et al. |
| 6,956,547 | B2 | 10/2005 | Bae et al. |
| 6,975,142 | B2 | 12/2005 | Azami et al. |
| 6,975,332 | B2 | 12/2005 | Arnold et al. |
| 6,995,510 | B2 | 2/2006 | Murakami et al. |
| 6,995,519 | B2 | 2/2006 | Arnold et al. |
| 7,023,408 | B2 | 4/2006 | Chen et al. |
| 7,027,015 | B2 | 4/2006 | Booth, Jr. et al. |
| 7,027,078 | B2 | 4/2006 | Reihl |
| 7,034,793 | B2 | 4/2006 | Sekiya et al. |
| 7,038,392 | B2 | 5/2006 | Libsch et al. |
| 7,057,359 | B2 | 6/2006 | Hung et al. |
| 7,061,451 | B2 | 6/2006 | Kimura |
| 7,064,733 | B2 | 6/2006 | Cok et al. |
| 7,071,932 | B2 | 7/2006 | Libsch et al. |
| 7,088,051 | B1 | 8/2006 | Cok |
| 7,088,052 | B2 | 8/2006 | Kimura |
| 7,102,378 | B2 | 9/2006 | Kuo et al. |
| 7,106,285 | B2 | 9/2006 | Naugler |
| 7,112,820 | B2 | 9/2006 | Chang et al. |
| 7,116,058 | B2 | 10/2006 | Lo et al. |
| 7,119,493 | B2 | 10/2006 | Fryer et al. |
| 7,122,835 | B1 | 10/2006 | Ikeda et al. |
| 7,127,380 | B1 | 10/2006 | Iverson et al. |
| 7,129,914 | B2 | 10/2006 | Knapp et al. |
| 7,164,417 | B2 | 1/2007 | Cok |
| 7,193,589 | B2 | 3/2007 | Yoshida et al. |
| 7,224,332 | B2 | 5/2007 | Cok |
| 7,227,519 | B1 | 6/2007 | Kawase et al. |
| 7,245,277 | B2 | 7/2007 | Ishizuka |
| 7,248,236 | B2 | 7/2007 | Nathan et al. |
| 7,262,753 | B2 | 8/2007 | Tanghe et al. |
| 7,274,363 | B2 | 9/2007 | Ishizuka et al. |
| 7,310,092 | B2 | 12/2007 | Imamura |
| 7,315,295 | B2 | 1/2008 | Kimura |
| 7,321,348 | B2 | 1/2008 | Cok et al. |
| 7,339,560 | B2 | 3/2008 | Sun |
| 7,355,574 | B1 | 4/2008 | Leon et al. |
| 7,358,941 | B2 | 4/2008 | Ono et al. |
| 7,368,868 | B2 | 5/2008 | Sakamoto |
| 7,411,571 | B2 | 8/2008 | Huh |
| 7,414,600 | B2 | 8/2008 | Nathan et al. |

(56) References Cited

U.S. PATENT DOCUMENTS

| | | | |
|---|---|---|---|
| 7,423,617 | B2 | 9/2008 | Giraldo et al. |
| 7,474,285 | B2 | 1/2009 | Kimura |
| 7,502,000 | B2 | 3/2009 | Yuki et al. |
| 7,528,812 | B2 | 5/2009 | Tsuge et al. |
| 7,535,449 | B2 | 5/2009 | Miyazawa |
| 7,554,512 | B2 | 6/2009 | Steer |
| 7,569,849 | B2 | 8/2009 | Nathan et al. |
| 7,576,718 | B2 | 8/2009 | Miyazawa |
| 7,580,012 | B2 | 8/2009 | Kim et al. |
| 7,589,707 | B2 | 9/2009 | Chou |
| 7,609,239 | B2 | 10/2009 | Chang |
| 7,619,594 | B2 | 11/2009 | Hu |
| 7,619,597 | B2 | 11/2009 | Nathan et al. |
| 7,633,470 | B2 | 12/2009 | Kane |
| 7,656,370 | B2 | 2/2010 | Schneider et al. |
| 7,800,558 | B2 | 9/2010 | Routley et al. |
| 7,847,764 | B2 | 12/2010 | Cok et al. |
| 7,859,492 | B2 | 12/2010 | Kohno |
| 7,868,859 | B2 | 1/2011 | Tomida et al. |
| 7,876,294 | B2 | 1/2011 | Sasaki et al. |
| 7,924,249 | B2 | 4/2011 | Nathan et al. |
| 7,932,883 | B2 | 4/2011 | Klompenhouwer et al. |
| 7,969,390 | B2 | 6/2011 | Yoshida |
| 7,978,187 | B2 | 7/2011 | Nathan et al. |
| 7,994,712 | B2 | 8/2011 | Sung et al. |
| 8,026,876 | B2 | 9/2011 | Nathan et al. |
| 8,049,420 | B2 | 11/2011 | Tamura et al. |
| 8,077,123 | B2 | 12/2011 | Naugler, Jr. |
| 8,115,707 | B2 | 2/2012 | Nathan et al. |
| 8,223,177 | B2 | 7/2012 | Nathan et al. |
| 8,232,939 | B2 | 7/2012 | Nathan et al. |
| 8,259,044 | B2 | 9/2012 | Nathan et al. |
| 8,264,431 | B2 | 9/2012 | Bulovic et al. |
| 8,279,143 | B2 | 10/2012 | Nathan et al. |
| 8,339,386 | B2 | 12/2012 | Leon et al. |
| 2001/0002703 | A1 | 6/2001 | Koyama |
| 2001/0009283 | A1 | 7/2001 | Arao et al. |
| 2001/0024181 | A1 | 9/2001 | Kubota |
| 2001/0024186 | A1 | 9/2001 | Kane et al. |
| 2001/0026257 | A1 | 10/2001 | Kimura |
| 2001/0030323 | A1 | 10/2001 | Ikeda |
| 2001/0040541 | A1 | 11/2001 | Yoneda et al. |
| 2001/0043173 | A1 | 11/2001 | Troutman |
| 2001/0045929 | A1 | 11/2001 | Prache |
| 2001/0052606 | A1 | 12/2001 | Sempel et al. |
| 2001/0052940 | A1 | 12/2001 | Hagihara et al. |
| 2002/0000576 | A1 | 1/2002 | Inukai |
| 2002/0011796 | A1 | 1/2002 | Koyama |
| 2002/0011799 | A1 | 1/2002 | Kimura |
| 2002/0012057 | A1 | 1/2002 | Kimura |
| 2002/0014851 | A1 | 2/2002 | Tai et al. |
| 2002/0018034 | A1 | 2/2002 | Ohki et al. |
| 2002/0030190 | A1 | 3/2002 | Ohtani et al. |
| 2002/0047565 | A1 | 4/2002 | Nara et al. |
| 2002/0052086 | A1 | 5/2002 | Maeda |
| 2002/0067134 | A1 | 6/2002 | Kawashima |
| 2002/0084463 | A1 | 7/2002 | Sanford et al. |
| 2002/0101172 | A1 | 8/2002 | Bu |
| 2002/0105279 | A1 | 8/2002 | Kimura |
| 2002/0117722 | A1 | 8/2002 | Osada et al. |
| 2002/0122308 | A1 | 9/2002 | Ikeda |
| 2002/0158587 | A1 | 10/2002 | Komiya |
| 2002/0158666 | A1 | 10/2002 | Azami et al. |
| 2002/0158823 | A1 | 10/2002 | Zavracky et al. |
| 2002/0167474 | A1 | 11/2002 | Everitt |
| 2002/0180369 | A1 | 12/2002 | Koyama |
| 2002/0180721 | A1 | 12/2002 | Kimura et al. |
| 2002/0186214 | A1 | 12/2002 | Siwinski |
| 2002/0190924 | A1 | 12/2002 | Asano et al. |
| 2002/0190971 | A1 | 12/2002 | Nakamura et al. |
| 2002/0195967 | A1 | 12/2002 | Kim et al. |
| 2002/0195968 | A1 | 12/2002 | Sanford et al. |
| 2003/0020413 | A1 | 1/2003 | Oomura |
| 2003/0030603 | A1 | 2/2003 | Shimoda |
| 2003/0043088 | A1 | 3/2003 | Booth et al. |
| 2003/0057895 | A1 | 3/2003 | Kimura |
| 2003/0058226 | A1 | 3/2003 | Bertram et al. |
| 2003/0062524 | A1 | 4/2003 | Kimura |
| 2003/0063081 | A1 | 4/2003 | Kimura et al. |
| 2003/0071821 | A1 | 4/2003 | Sundahl et al. |
| 2003/0076048 | A1 | 4/2003 | Rutherford |
| 2003/0090447 | A1 | 5/2003 | Kimura |
| 2003/0090481 | A1 | 5/2003 | Kimura |
| 2003/0107560 | A1 | 6/2003 | Yumoto et al. |
| 2003/0111966 | A1 | 6/2003 | Mikami et al. |
| 2003/0122745 | A1 | 7/2003 | Miyazawa |
| 2003/0122813 | A1 | 7/2003 | Ishizuki et al. |
| 2003/0142088 | A1 | 7/2003 | LeChevalier |
| 2003/0151569 | A1 | 8/2003 | Lee et al. |
| 2003/0156101 | A1 | 8/2003 | Le Chevalier |
| 2003/0174152 | A1 | 9/2003 | Noguchi |
| 2003/0179626 | A1 | 9/2003 | Sanford et al. |
| 2003/0197663 | A1 | 10/2003 | Lee et al. |
| 2003/0210256 | A1 | 11/2003 | Mori et al. |
| 2003/0230141 | A1 | 12/2003 | Gilmour et al. |
| 2003/0230980 | A1 | 12/2003 | Forrest et al. |
| 2003/0231148 | A1 | 12/2003 | Lin et al. |
| 2004/0032382 | A1 | 2/2004 | Cok et al. |
| 2004/0066357 | A1 | 4/2004 | Kawasaki |
| 2004/0070557 | A1 | 4/2004 | Asano et al. |
| 2004/0070565 | A1 | 4/2004 | Nayar et al. |
| 2004/0090186 | A1 | 5/2004 | Kanauchi et al. |
| 2004/0090400 | A1 | 5/2004 | Yoo |
| 2004/0095297 | A1 | 5/2004 | Libsch et al. |
| 2004/0100427 | A1 | 5/2004 | Miyazawa |
| 2004/0108518 | A1 | 6/2004 | Jo |
| 2004/0135749 | A1 | 7/2004 | Kondakov et al. |
| 2004/0145547 | A1 | 7/2004 | Oh |
| 2004/0150592 | A1 | 8/2004 | Mizukoshi et al. |
| 2004/0150594 | A1 | 8/2004 | Koyama et al. |
| 2004/0150595 | A1 | 8/2004 | Kasai |
| 2004/0155841 | A1 | 8/2004 | Kasai |
| 2004/0174347 | A1 | 9/2004 | Sun et al. |
| 2004/0174354 | A1 | 9/2004 | Ono et al. |
| 2004/0178743 | A1 | 9/2004 | Miller et al. |
| 2004/0183759 | A1 | 9/2004 | Stevenson et al. |
| 2004/0189627 | A1 | 9/2004 | Shirasaki et al. |
| 2004/0196275 | A1 | 10/2004 | Hattori |
| 2004/0207615 | A1 | 10/2004 | Yumoto |
| 2004/0239596 | A1 | 12/2004 | Ono et al. |
| 2004/0246246 | A1 * | 12/2004 | Tobita ........................... 345/205 |
| 2004/0252089 | A1 | 12/2004 | Ono et al. |
| 2004/0257313 | A1 | 12/2004 | Kawashima et al. |
| 2004/0257353 | A1 | 12/2004 | Imamura et al. |
| 2004/0257355 | A1 | 12/2004 | Naugler |
| 2004/0263437 | A1 | 12/2004 | Hattori |
| 2004/0263444 | A1 | 12/2004 | Kimura |
| 2004/0263445 | A1 | 12/2004 | Inukai et al. |
| 2004/0263541 | A1 | 12/2004 | Takeuchi et al. |
| 2005/0007355 | A1 | 1/2005 | Miura |
| 2005/0007357 | A1 | 1/2005 | Yamashita et al. |
| 2005/0017650 | A1 | 1/2005 | Fryer et al. |
| 2005/0024081 | A1 | 2/2005 | Kuo et al. |
| 2005/0024393 | A1 | 2/2005 | Kondo et al. |
| 2005/0030267 | A1 | 2/2005 | Tanghe et al. |
| 2005/0057580 | A1 | 3/2005 | Yamano et al. |
| 2005/0067970 | A1 | 3/2005 | Libsch et al. |
| 2005/0067971 | A1 | 3/2005 | Kane |
| 2005/0068270 | A1 | 3/2005 | Awakura |
| 2005/0068275 | A1 | 3/2005 | Kane |
| 2005/0073264 | A1 | 4/2005 | Matsumoto |
| 2005/0083323 | A1 | 4/2005 | Suzuki et al. |
| 2005/0088103 | A1 | 4/2005 | Kageyama et al. |
| 2005/0110420 | A1 | 5/2005 | Arnold et al. |
| 2005/0110807 | A1 | 5/2005 | Chang |
| 2005/0140598 | A1 | 6/2005 | Kim et al. |
| 2005/0140610 | A1 | 6/2005 | Smith et al. |
| 2005/0145891 | A1 | 7/2005 | Abe |
| 2005/0156831 | A1 | 7/2005 | Yamazaki et al. |
| 2005/0168416 | A1 | 8/2005 | Hashimoto et al. |
| 2005/0179626 | A1 | 8/2005 | Yuki et al. |
| 2005/0179628 | A1 | 8/2005 | Kimura |
| 2005/0185200 | A1 | 8/2005 | Tobol |
| 2005/0200575 | A1 | 9/2005 | Kim et al. |

(56) References Cited

U.S. PATENT DOCUMENTS

2005/0206590 A1 9/2005 Sasaki et al.
2005/0219184 A1 10/2005 Zehner et al.
2005/0248515 A1 11/2005 Naugler et al.
2005/0269959 A1 12/2005 Uchino et al.
2005/0269960 A1 12/2005 Ono et al.
2005/0280615 A1 12/2005 Cok et al.
2005/0280766 A1 12/2005 Johnson et al.
2005/0285822 A1 12/2005 Reddy et al.
2005/0285825 A1 12/2005 Eom et al.
2006/0001613 A1 1/2006 Routley et al.
2006/0007072 A1 1/2006 Choi et al.
2006/0012310 A1 1/2006 Chen et al.
2006/0012311 A1 1/2006 Ogawa
2006/0027807 A1 2/2006 Nathan et al.
2006/0030084 A1 2/2006 Young
2006/0038758 A1 2/2006 Routley et al.
2006/0038762 A1 2/2006 Chou
2006/0066533 A1 3/2006 Sato et al.
2006/0077135 A1 4/2006 Cok et al.
2006/0082523 A1 4/2006 Guo et al.
2006/0092185 A1 5/2006 Jo et al.
2006/0097628 A1 5/2006 Suh et al.
2006/0097631 A1 5/2006 Lee
2006/0103611 A1 5/2006 Choi
2006/0149493 A1 7/2006 Sambandan et al.
2006/0170623 A1 8/2006 Naugler, Jr. et al.
2006/0176250 A1 8/2006 Nathan et al.
2006/0208961 A1 9/2006 Nathan et al.
2006/0232522 A1 10/2006 Roy et al.
2006/0244697 A1 11/2006 Lee et al.
2006/0261841 A1 11/2006 Fish
2006/0273997 A1 12/2006 Nathan et al.
2006/0284801 A1 12/2006 Yoon et al.
2006/0284895 A1 12/2006 Marcu et al.
2006/0290618 A1 12/2006 Goto
2007/0001937 A1 1/2007 Park et al.
2007/0001939 A1 1/2007 Hashimoto et al.
2007/0008268 A1 1/2007 Park et al.
2007/0008297 A1 1/2007 Bassetti
2007/0057873 A1 3/2007 Uchino et al.
2007/0069998 A1 3/2007 Naugler et al.
2007/0075727 A1 4/2007 Nakano et al.
2007/0076226 A1 4/2007 Klompenhouwer et al.
2007/0080905 A1 4/2007 Takahara
2007/0080906 A1 4/2007 Tanabe
2007/0080908 A1 4/2007 Nathan et al.
2007/0097038 A1 5/2007 Yamazaki et al.
2007/0097041 A1 5/2007 Park et al.
2007/0103419 A1 5/2007 Uchino et al.
2007/0115221 A1 5/2007 Buchhauser et al.
2007/0182671 A1 8/2007 Nathan et al.
2007/0236517 A1 10/2007 Kimpe
2007/0241999 A1 10/2007 Lin
2007/0273294 A1 11/2007 Nagayama
2007/0285359 A1 12/2007 Ono
2007/0290958 A1 12/2007 Cok
2007/0296672 A1 12/2007 Kim et al.
2008/0001525 A1 1/2008 Chao et al.
2008/0001544 A1 1/2008 Murakami et al.
2008/0036708 A1 2/2008 Shirasaki
2008/0042942 A1 2/2008 Takahashi
2008/0042948 A1 2/2008 Yamashita et al.
2008/0048951 A1 2/2008 Naugler, Jr. et al.
2008/0055209 A1 3/2008 Cok
2008/0074413 A1 3/2008 Ogura
2008/0088549 A1 4/2008 Nathan et al.
2008/0088648 A1 4/2008 Nathan et al.
2008/0117144 A1 5/2008 Nakano et al.
2008/0150847 A1 6/2008 Kim et al.
2008/0231558 A1 9/2008 Naugler
2008/0231562 A1 9/2008 Kwon
2008/0252571 A1 10/2008 Hente et al.
2008/0290805 A1 11/2008 Yamada et al.
2008/0297055 A1 12/2008 Miyake et al.
2009/0058772 A1 3/2009 Lee
2009/0160743 A1 6/2009 Tomida et al.
2009/0174628 A1 7/2009 Wang et al.
2009/0184901 A1 7/2009 Kwon
2009/0195483 A1 8/2009 Naugler, Jr. et al.
2009/0201281 A1 8/2009 Routley et al.
2009/0213046 A1 8/2009 Nam
2010/0004891 A1 1/2010 Ahlers et al.
2010/0026725 A1 2/2010 Smith
2010/0060911 A1 3/2010 Marcu et al.
2010/0165002 A1 7/2010 Ahn
2010/0194670 A1 8/2010 Cok
2010/0207960 A1 8/2010 Kimpe et al.
2010/0277400 A1 11/2010 Jeong
2010/0315319 A1 12/2010 Cok et al.
2011/0069051 A1 3/2011 Nakamura et al.
2011/0069089 A1 3/2011 Kopf et al.
2011/0074750 A1 3/2011 Leon et al.
2011/0149166 A1 6/2011 Botzas et al.
2011/0227964 A1 9/2011 Chaji et al.
2011/0293480 A1 12/2011 Mueller
2012/0056558 A1 3/2012 Toshiya et al.
2012/0062565 A1 3/2012 Fuchs et al.
2012/0299978 A1 11/2012 Chaji
2013/0027381 A1 1/2013 Nathan et al.
2013/0057595 A1 3/2013 Nathan et al.
2013/0241813 A1* 9/2013 Tanaka .......................... 345/100

FOREIGN PATENT DOCUMENTS

CA 2 249 592 7/1998
CA 2 368 386 9/1999
CA 2 242 720 1/2000
CA 2 354 018 6/2000
CA 2 432 530 7/2002
CA 2 436 451 8/2002
CA 2 438 577 8/2002
CA 2 463 653 1/2004
CA 2 498 136 3/2004
CA 2 522 396 11/2004
CA 2 443 206 3/2005
CA 2 472 671 12/2005
CA 2 567 076 1/2006
CA 2 526 782 4/2006
CA 2 550 102 4/2008
CN 1381032 11/2002
CN 1448908 10/2003
CN 1760945 4/2006
EP 0 158 366 10/1985
EP 1 028 471 8/2000
EP 1 111 577 6/2001
EP 1 130 565 A1 9/2001
EP 1 194 013 4/2002
EP 1 335 430 A1 8/2003
EP 1 372 136 12/2003
EP 1 381 019 1/2004
EP 1 418 566 5/2004
EP 1 429 312 A 6/2004
EP 1 465 143 A 10/2004
EP 1 469 448 A 10/2004
EP 1 521 203 A2 4/2005
EP 1 594 347 11/2005
EP 1 784 055 A2 5/2007
EP 1 879 169 A1 1/2008
EP 1 879 172 1/2008
GB 2 389 951 12/2003
JP 1 272 298 10/1989
JP 4-042619 2/1992
JP 6-314977 11/1994
JP 8-340243 12/1996
JP 09-090405 4/1997
JP 10-254410 9/1998
JP 11-202295 7/1999
JP 11-219146 8/1999
JP 11 231805 8/1999
JP 11-282419 10/1999
JP 2000-056847 2/2000
JP 2000-81607 3/2000
JP 2001-134217 5/2001
JP 2001-195014 7/2001

(56) References Cited

FOREIGN PATENT DOCUMENTS

| | | | |
|---|---|---|---|
| JP | 2002-055654 | | 2/2002 |
| JP | 2002-91376 | | 3/2002 |
| JP | 2002-514320 | | 5/2002 |
| JP | 2002-278513 | | 9/2002 |
| JP | 2002-333862 | | 11/2002 |
| JP | 2003-076331 | | 3/2003 |
| JP | 2003-124519 | | 4/2003 |
| JP | 2003-177709 | | 6/2003 |
| JP | 2003-271095 | | 9/2003 |
| JP | 2003-308046 | | 10/2003 |
| JP | 2003-317944 | | 11/2003 |
| JP | 2004-145197 | | 5/2004 |
| JP | 2004-287345 | | 10/2004 |
| JP | 2005-057217 | | 3/2005 |
| JP | 4-158570 | | 10/2008 |
| KR | 2004-0100887 | | 12/2004 |
| TW | 342486 | | 10/1998 |
| TW | 473622 | | 1/2002 |
| TW | 485337 | | 5/2002 |
| TW | 502233 | | 9/2002 |
| TW | 538650 | | 6/2003 |
| TW | 1221268 | | 9/2004 |
| TW | 200727247 | | 7/2007 |
| WO | WO 98/48403 | | 10/1998 |
| WO | WO 99/48079 | | 9/1999 |
| WO | WO 01/06484 | | 1/2001 |
| WO | WO 01/27910 | A1 | 4/2001 |
| WO | WO 01/63587 | A2 | 8/2001 |
| WO | WO 02/067327 | A | 8/2002 |
| WO | WO 03/001496 | A1 | 1/2003 |
| WO | WO 03/034389 | A | 4/2003 |
| WO | WO 03/058594 | A1 | 7/2003 |
| WO | WO 03/063124 | | 7/2003 |
| WO | WO 03/077231 | | 9/2003 |
| WO | WO 2004/003877 | | 1/2004 |
| WO | WO 2004/025615 | A | 3/2004 |
| WO | WO 2004/034364 | | 4/2004 |
| WO | WO 2004/047058 | | 6/2004 |
| WO | WO 2004/104975 | A1 | 12/2004 |
| WO | WO 2005/022498 | | 3/2005 |
| WO | WO 2005/022500 | A | 3/2005 |
| WO | WO 2005/029455 | | 3/2005 |
| WO | WO 2005/029456 | | 3/2005 |
| WO | WO 2005/055185 | | 6/2005 |
| WO | WO 2006/000101 | A1 | 1/2006 |
| WO | WO 2006/053424 | | 5/2006 |
| WO | WO 2006/063448 | A | 6/2006 |
| WO | WO 2006/084360 | | 8/2006 |
| WO | WO 2007/003877 | A | 1/2007 |
| WO | WO 2007/079572 | | 7/2007 |
| WO | WO 2007/120849 | A2 | 10/2007 |
| WO | WO 2009/055920 | | 5/2009 |
| WO | WO 2010/023270 | | 3/2010 |
| WO | WO 2011/041224 | A1 | 4/2011 |

OTHER PUBLICATIONS

Alexander et al.: "Pixel circuits and drive schemes for glass and elastic AMOLED displays"; dated Jul. 2005 (9 pages).

Alexander et al.: "Unique Electrical Measurement Technology for Compensation, Inspection, and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "A Stable Voltage-Programmed Pixel Circuit for a-Si:H AMOLED Displays"; dated Dec. 2006 (12 pages).

Chaji et al.: "A Sub-μA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated May 2003 (4 pages).

Chaji et al.: "Fast and Offset-Leakage Insensitive Current-Mode Line Driver for Active Matrix Displays and Sensors"; dated Feb. 2009 (8 pages).

Chaji et al.: "High Speed Low Power Adder Design With a New Logic Style: Pseudo Dynamic Logic (SDL)"; dated Oct. 2001 (4 pages).

Chaji et al.: "High-precision, fast current source for large-area current-programmed a-Si flat panels"; dated Sep. 2006 (4 pages).

Chaji et al.: "Low-Cost AMOLED Television with IGNIS Compensating Technology"; dated May 2008 (4 pages).

Chaji et al.: "Low-Cost Stable a-Si:H AMOLED Display for Portable Applications"; dated Jun. 2006 (4 pages).

Chaji et al.: "Low-Power Low-Cost Voltage-Programmed a-Si:H AMOLED Display"; dated Jun. 2008 (5 pages).

Chaji et al.: "Merged phototransistor pixel with enhanced near infrared response and flicker noise reduction for biomolecular imaging"; dated Nov. 2008 (3 pages).

Chaji et al.: "Parallel Addressing Scheme for Voltage-Programmed Active-Matrix OLED Displays"; dated May 2007 (6 pages).

Chaji et al.: "Pseudo dynamic logic (SDL): a high-speed and low-power dynamic logic family"; dated 2002 (4 pages).

Chaji et al.: "Stable a-Si:H circuits based on short-term stress stability of amorphous silicon thin film transistors"; dated May 2006 (4 pages).

Chaji et al.: "Stable Pixel Circuit for Small-Area High- Resolution a-Si:H AMOLED Displays"; dated Oct. 2008 (6 pages).

Chaji et al.: "Stable RGBW AMOLED display with OLED degradation compensation using electrical feedback"; dated Feb. 2010 (2 pages).

Chaji et al.: "Thin-Film Transistor Integration for Biomedical Imaging and AMOLED Displays"; dated 2008 (177 pages).

European Search Report for EP Application No. EP 10166143, dated Sep. 3, 2010 (2 pages).

European Search Report for European Application No. EP 11739485.8-1904 dated Aug. 6, 2013, (14 pages).

European Search Report for European Application No. EP 011122313 dated Sep. 14, 2005 (4 pages).

European Search Report for European Application No. EP 04786661 dated Mar. 9, 2009.

European Search Report for European Application No. EP 05759141 dated Oct. 30, 2009 (2 pages).

European Search Report for European Application No. EP 05819617 dated Jan. 30, 2009.

European Search Report for European Application No. EP 06705133 dated Jul. 18, 2008.

European Search Report for European Application No. EP 06721798 dated Nov. 12, 2009 (2 pages).

(56) References Cited

OTHER PUBLICATIONS

European Search Report for European Application No. EP 07719579 dated May 20, 2009.
European Search Report for European Application No. EP 07815784 dated Jul. 20, 2010 (2 pages).
European Search Report for European Application No. EP 07710608.6 dated Mar. 19, 2010 (7 pages).
European Search Report, Application No. EP 10834294.0-1903, dated Apr. 8, 2013, (9 pages).
European Supplementary Search Report corresponding to European Application No. EP 04786662 dated Jan. 19, 2007 (2 pages).
Extended European Search Report mailed Apr. 27, 2011 issued during prosecution of European patent application No. EP 09733076.5 (13 pages).
Extended European Search Report mailed Jul. 11, 2012 which issued in corresponding European Patent Application No. EP 11191641.7 (14 pages).
Extended European Search Report mailed Nov. 29, 2012, issued in European Patent Application No. EP 11168677.0 (13 page).
Fossum, Eric R.. "Active Pixel Sensors: Are CCD's Dinosaurs?" SPIE: Symposium on Electronic Imaging. Feb. 1, 1993 (13 pages).
International Preliminary Report on Patentability for International Application No. PCT/CA2005/001007 dated Oct. 16, 2006, 4 pages.
International Search Report corresponding to International Application No. PCT/IB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/055486, Dated Apr. 19, 2011, 5 pages.
International Search Report for International Application No. PCT/CA2005/001007 dated Oct. 18, 2005.
International Search Report for International Application No. PCT/CA2007/000652 dated Jul. 25, 2007.
International Search Report for International Application No. PCT/CA2006/000177 dated Jun. 2, 2006.
International Search Report for International Application No. PCT/CA2004/001741 dated Feb. 21, 2005.
International Search Report for PCT Application No. PCT/CA2009/001769, dated Apr. 8, 2010 (3 pages).
International Search Report mailed Dec. 3, 2002, issued in International Patent Application No. PCT/JP02/09668 (4 pages).
International Search Report mailed Jul. 30, 2009 for International Application No. PCT/CA2009/000501 (4 pages).
International Search Report mailed Mar. 21, 2006 issued in International Patent Application No. PCT/CA2005/001897 (2 pages).
International Search Report, PCT/IB2012/052372, mailed Sep. 12, 2012 (3 pages).
International Searching Authority Search Report, PCT/IB2010/055481, dated Apr. 7, 2011, 3 pages.
International Searching Authority Search Report, PCT/IB2011/051103, dated Jul. 8, 2011, 3 pages.
International Searching Authority Written Opinion, PCT/IB2010/055481, dated Apr. 7, 2011, 6 pages.
International Searching Authority Written Opinion, PCT/IB2011/051103, dated Jul. 8, 2011, 6 pages.
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/055486, Dated Apr. 19, 2011, 8 pages.
International Written Opinion for International Application No. PCT/CA2009/000501 mailed Jul. 30, 2009 (6 pages).
International Written Opinion mailed Mar. 21, 2006 corresponding to International Patent Application No. PCT/CA2005/001897 (4 pages).
International Written Opinion of the International Searching Authority corresponding to International Application No. PCT/IB2011/050502, dated Jun. 27, 2011 (7 pages).
International Written Opinion of the International Searching Authority corresponding to International Application No. PCT/IB2010/055541, dated May 26, 2011; 6 pages.
International Written Opinion, PCT/IB2012/052372, mailed Sep. 12, 2012 (6 pages).
Jafarabadiashtiani et al.: "A New Driving Method for a-Si AMOLED Displays Based on Voltage Feedback"; dated 2005 (4 pages).
Joon-Chul Goh et al., "A New a-Si:H Thin-Film Transistor Pixel Circuit for Active-Matrix Organic Light-Emitting Diodes", IEEE Electron Device Letters, Vol, 24, No. 9, Sep. 2003, pp. 583-585.
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee et al.: "Ambipolar Thin-Film Transistors Fabricated by PECVD Nanocrystalline Silicon"; dated 2006 (6 pages).
Lee, Wonbok: "Thermal Management in Microprocessor Chips and Dynamic Backlight Control in Liquid Crystal Displays", Ph.D. Dissertation, University of Southern California (124 pages).
Ma E Y et al.: "organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a -Si for AMOLED—Meeting the Performance and Cost Demands of Display Applications (Cell Phone to HDTV)", dated 2006 (4 pages).
Office Action in Japanese patent application No. JP2006-527247 dated Mar. 15, 2010. (8 pages).
Office Action in Japanese patent application No. JP2007-545796 dated Sep. 5, 2011. (8 pages).
Partial European Search Report mailed Mar. 20, 2012 which issued in corresponding European Patent Application No. EP 11191641.7 (8 pages).
Partial European Search Report mailed Sep. 22, 2011 corresponding to European Patent Application No. EP 11168677.0 (5 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).

(56) References Cited

OTHER PUBLICATIONS

Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Search Report for Taiwan Invention Patent Application No. 093128894 dated May 1, 2012. (1 page).
Search Report for Taiwan Invention Patent Application No. 94144535 dated Nov. 1, 2012. (1 page).
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
International Search Report corresponding to co-pending International Patent Application Serial No. PCT/IB2013/054251, Canadian Intellectual Property Office, dated Sep. 11, 2013; (4 pages).
International Written Opinion corresponding to co-pending International Patent Application Serial No. PCT/IB2013/054251, Canadian Intellectual Property Office, dated Sep. 11, 2013; (5 pages).

* cited by examiner

DISPLAY SYSTEMS WITH COMPENSATION FOR LINE PROPAGATION DELAY

CROSS REFERENCE TO RELATED APPLICATION

This application claims the benefit of U.S. Provisional Patent Application No. 61/650,996, filed May 23, 2012, entitled "Display Systems with Compensation for Line Propagation Display" and U.S. Provisional Patent Application No. 61/659,399, filed Jun. 13, 2012, entitled "Display Systems with Compensation for Line Propagation Display" both of which are hereby incorporated by reference in their entirety.

FIELD OF THE INVENTION

The present disclosure generally relates to circuits for use in displays, and methods of driving, calibrating, and programming displays, particularly displays such as active matrix organic light emitting diode displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Some schemes for providing compensation to displays to account for variations across the display panel and over time utilize monitoring systems to measure time dependent parameters associated with the aging (i.e., degradation) of the pixel circuits. The measured information can then be used to inform subsequent programming of the pixel circuits so as to ensure that any measured degradation is accounted for by adjustments made to the programming. Such monitored pixel circuits may require the use of additional transistors and/or lines to selectively couple the pixel circuits to the monitoring systems and provide for reading out information. The incorporation of additional transistors and/or lines may undesirably decrease pixel-pitch (i.e., "pixel density").

SUMMARY

Aspects of the present disclosure provide pixel circuits suitable for use in a monitored display configured to provide compensation for pixel aging. Pixel circuit configurations disclosed herein allow for a monitor to access nodes of the pixel circuit via a monitoring switch transistor such that the monitor can measure currents and/or voltages indicative of an amount of degradation of the pixel circuit. Aspects of the present disclosure further provide pixel circuit configurations which allow for programming a pixel independent of a resistance of a switching transistor. Pixel circuit configurations disclosed herein include transistors for isolating a storage capacitor within the pixel circuit from a driving transistor such that the charge on the storage capacitor is not affected by current through the driving transistor during a programming operation.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
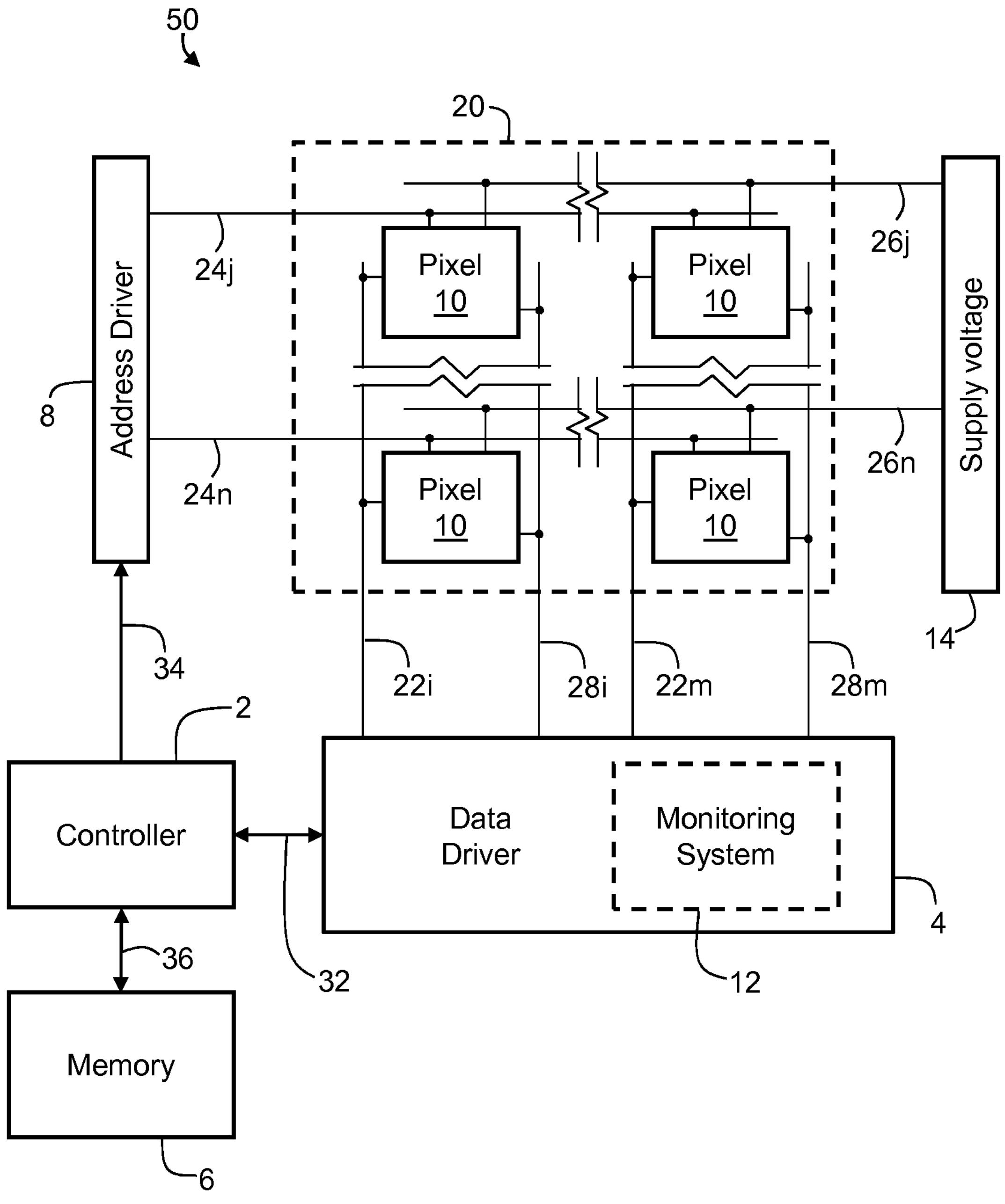
FIG. 1 illustrates an exemplary configuration of a system for monitoring degradation in a pixel and providing compensation therefore according to the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, it is to cover all modifications, equivalents, and alternatives falling within the spirit and scope of the invention as defined by the appended claims.

DETAILED DESCRIPTION

FIG. 1 is a diagram of an exemplary display system 50. The display system 50 includes an address driver 8, a data driver 4, a controller 2, a memory storage 6, and display panel 20. The display panel 20 includes an array of pixels 10 arranged in rows and columns. Each of the pixels 10 is individually programmable to emit light with individually programmable luminance values. The controller 2 receives digital data indicative of information to be displayed on the display panel 20. The controller 2 sends signals 32 to the data driver 4 and scheduling signals 34 to the address driver 8 to drive the pixels 10 in the display panel 20 to display the information indicated. The plurality of pixels 10 associated with the display panel 20 thus comprise a display array ("display screen") adapted to dynamically display information according to the input digital data received by the controller 2. The display screen can display, for example, video information from a stream of video data received by the controller 2. The supply voltage 14 can provide a constant power voltage or can be an adjustable voltage supply that is controlled by signals from the controller 2. The display system 50 can also incorporate features from a current source or sink (not shown) to provide biasing currents to the pixels 10 in the display panel 20 to thereby decrease programming time for the pixels 10.

For illustrative purposes, the display system 50 in FIG. 1 is illustrated with only four pixels 10 in the display panel 20. It is understood that the display system 50 can be implemented with a display screen that includes an array of similar pixels, such as the pixels 10, and that the display screen is not limited to a particular number of rows and columns of pixels. For example, the display system 50 can be implemented with a display screen with a number of rows and columns of pixels commonly available in displays for mobile devices, monitor-based devices, and/or projection-devices.

The pixel 10 is operated by a driving circuit ("pixel circuit") that generally includes a driving transistor 202 (shown in FIG. 2) and a light emitting device 204. Hereinafter the pixel 10 may refer to the pixel circuit. The light emitting device 204 can optionally be an organic light emitting diode, but implementations of the present disclosure apply to pixel circuits having other electroluminescence devices, including current-driven light emitting devices. The driving transistor 202 in the pixel 10 can optionally be an n-type or p-type amorphous silicon thin-film transistor, but implementations of the present disclosure are not limited to pixel circuits having a particular polarity of transistor or only to pixel circuits having thin-film transistors. The pixel circuit 10 can also include a storage capacitor 200 (shown in FIG. 2) for storing programming information and allowing the pixel circuit 10 to drive the light emitting device 204 after being addressed. Thus, the display panel 20 can be an active matrix display array.

As illustrated in FIG. 1, the pixel 10 illustrated as the top-left pixel in the display panel 20 is coupled to a select line 24*j*, a supply line 26*j*, a data line 22*i*, and a monitor line 28*i*. In an implementation, the supply voltage 14 can also provide a second supply line to the pixel 10. For example, each pixel can be coupled to a first supply line charged with Vdd and a second supply line coupled with Vss, and the pixel circuits 10 can be situated between the first and second supply lines to facilitate driving current between the two supply lines during an emission phase of the pixel circuit. The top-left pixel 10 in the display panel 20 can correspond to a pixel in the display panel in a "jth" row and "ith" column of the display panel 20. Similarly, the top-right pixel 10 in the display panel 20 represents a "jth" row and "mth" column; the bottom-left pixel 10 represents an "nth" row and "ith" column; and the bottom-right pixel 10 represents an "nth" row and "ith" column. Each of the pixels 10 is coupled to appropriate select lines (e.g., the select lines 24*j* and 24*n*), supply lines (e.g., the supply lines 26*j* and 26*n*), data lines (e.g., the data lines 22*i* and 22*m*), and monitor lines (e.g., the monitor lines 28*i* and 28*m*). It is noted that aspects of the present disclosure apply to pixels having additional connections, such as connections to additional select lines, and to pixels having fewer connections, such as pixels lacking a connection to a monitoring line.

With reference to the top-left pixel 10 shown in the display panel 20, the select line 24*j* is provided by the address driver 8, and can be utilized to enable, for example, a programming operation of the pixel 10 by activating a switch or transistor to allow the data line 22*i* to program the pixel 10. The data line 22*i* conveys programming information from the data driver 4 to the pixel 10. For example, the data line 22*i* can be utilized to apply a programming voltage or a programming current to the pixel 10 in order to program the pixel 10 to emit a desired amount of luminance. The programming voltage (or programming current) supplied by the data (or source) driver 4 via the data line 22*i* is a voltage (or current) appropriate to cause the pixel 10 to emit light with a desired amount of luminance according to the digital data received by the controller 2. The programming voltage (or programming current) can be applied to the pixel 10 during a programming operation of the pixel 10 so as to charge a storage device 200 within the pixel 10, such as a storage capacitor (FIG. 2), thereby enabling the pixel 10 to emit light with the desired amount of luminance during an emission operation following the programming operation. For example, the storage device 200 in the pixel 10 can be charged during a programming operation to apply a voltage to one or more of a gate or a source terminal of the driving transistor 202 during the emission operation, thereby causing the driving transistor 202 to convey the driving current through the light emitting device 204 according to the voltage stored on the storage device 200.

Generally, in the pixel 10, the driving current that is conveyed through the light emitting device 204 by the driving transistor 202 during the emission operation of the pixel 10 is a current that is supplied by the first supply line 26*j* and is drained to a second supply line (not shown). The first supply line 22*j* and the second supply line are coupled to the voltage supply 14. The first supply line 26*j* can provide a positive supply voltage (e.g., the voltage commonly referred to in circuit design as "Vdd") and the second supply line can provide a negative supply voltage (e.g., the voltage commonly referred to in circuit design as "Vss"). In some embodiments, one or the other of the supply lines (e.g., the supply line 26*j*) are fixed at a ground voltage or at another reference voltage.

The display system 50 also includes a readout or monitoring system 12. With reference again to the top left pixel 10 in the display panel 20, the monitor line 28*i* connects the pixel 10 to the monitoring system 12. The monitoring system 12 can be integrated with the data driver 4, or can be a separate stand-alone system. In particular, the monitoring system 12 can optionally be implemented by monitoring the current and/or voltage of the data line 22*i* during a monitoring operation of the pixel 10, and the monitor line 28*i* can be entirely omitted. Additionally, the display system 50 can be implemented without the monitoring system 12 or the monitor line 28*i*. The monitor line 28*i* allows the monitoring system 12 to measure a current or voltage associated with the pixel 10 and thereby extract information indicative of a degradation of the pixel 10. For example, the monitoring system 12 can extract, via the monitor line 28*i*, a current flowing through the driving transistor 202 within the pixel 10 and thereby determine, based on the measured current and based on the voltages applied to the driving transistor 202 during the measurement, a threshold voltage of the driving transistor 202 or a shift thereof. Generally then, measuring the current through the driving transistor 202 allows for extraction of the current-voltage characteristics of the driving transistor 202. For example, by measuring the current through the drive transistor 202 ($I_{DS}$), the threshold voltage Vth and/or the parameter β can be determined according to the relation $I_{DS}=\beta(V_{GS}-Vth)^2$, where $V_{GS}$ is the gate-source voltage applied to the driving transistor 202.

The monitoring system 12 can additionally or alternatively extract an operating voltage of the light emitting device 204 (e.g., a voltage drop across the light emitting device while the light emitting device is operating to emit light). The monitoring system 12 can then communicate the signals 32 to the controller 2 and/or the memory 6 to allow the display system 50 to store the extracted degradation information in the memory 6. During subsequent programming and/or emission operations of the pixel 10, the degradation information is retrieved from the memory 6 by the controller 2 via the memory signals 36, and the controller 2 then compensates for the extracted degradation information in subsequent programming and/or emission operations of the pixel 10 by increasing or decreasing the programming values by a compensation value. For example, once the degradation information is extracted, the programming information conveyed to the pixel 10 via the data line 22*i* can be appropriately adjusted during a subsequent programming operation of the pixel 10 such that the pixel 10 emits light with a desired amount of luminance that is independent of the degradation of the pixel 10. In an example, an increase in the threshold voltage of the driving transistor 202 within the pixel 10 can be compensated for by appropriately increasing the programming voltage applied to the pixel 10.

Figure 2:
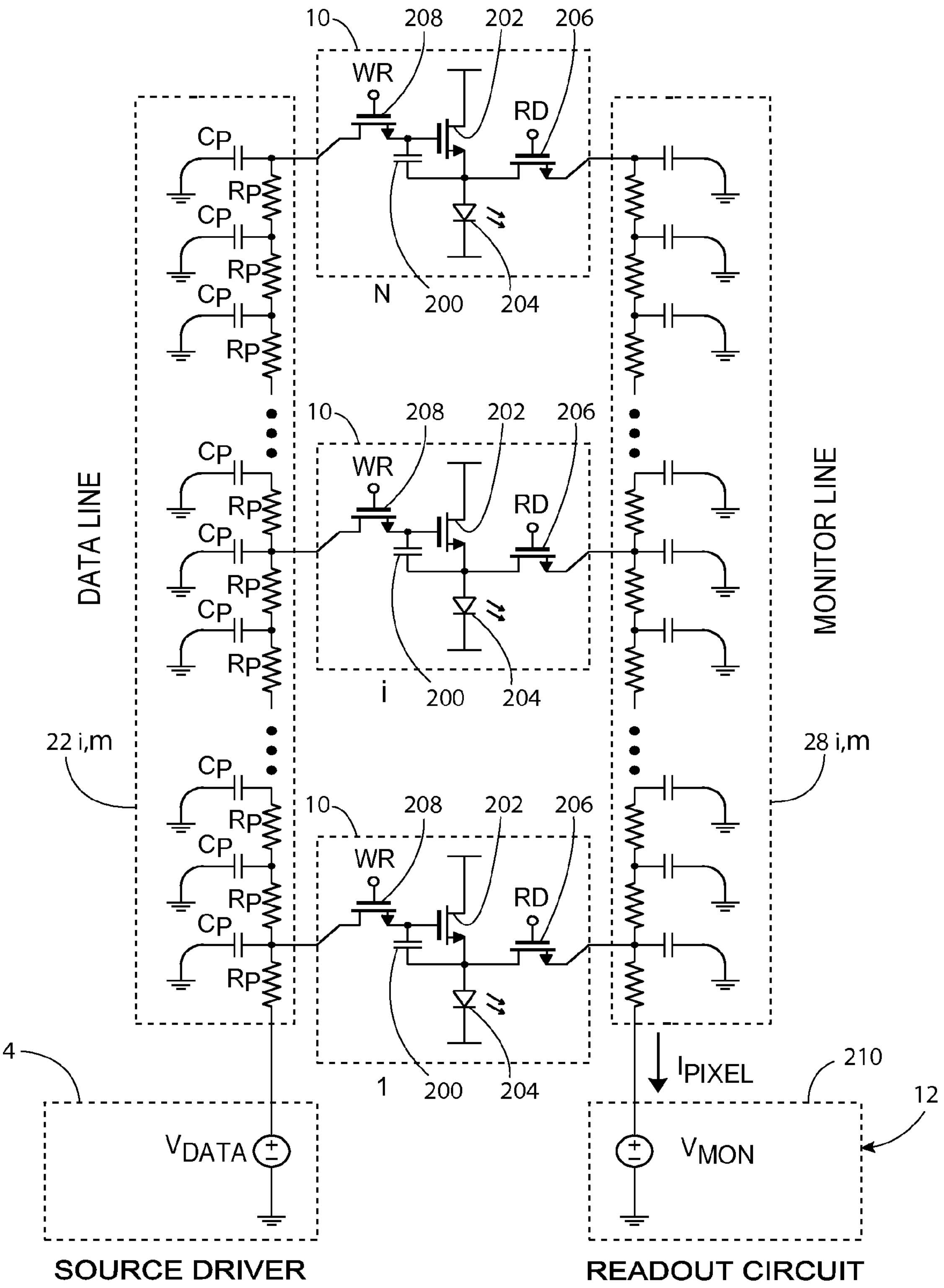
FIG. 2 is a circuit diagram of an RC model of data and monitor lines in a display system.

Furthermore, as discussed herein, the monitoring system 12 can additionally or alternatively extract information indicative of a voltage offset in the programming and/or monitoring readout (such as using a readout circuit 210 or monitoring system 12 shown in FIG. 2) due to propagation delay in the data line (e.g., the data lines 22*i*, 22*m*) resulting from the parasitic effects of line resistance and line capacitance during the programming and/or monitoring intervals.

According to some embodiments disclosed herein, optimum performance of Active Matrix Organic Light Emitting (AMOLED) displays is adversely affected by nonuniformity, aging, and hysteresis of both OLED and backplane devices (Amorphous, Poly-Silicon, or Metal-Oxide TFT). These adverse effects introduce both time-invariant and time-variant factors into the operation of the display that can be accounted for by characterizing the various factors and providing adjustments during the programming process. In large area applications where full-high definition (FHD) and ultra-high definition (UHD) specifications along with high refresh-rate (e.g., 120 Hz and 240 Hz) are demanded, the challenge of operating an AMOLED display is even greater. For example, reduced programming durations enhance the influence of dynamic effects on programming and display operations.

In addition, the finite conductance of very long metal (or otherwise conductive) lines through which the AMOLED pixels are accessed and programmed (e.g., the lines 22*i*, 28*i*, 22*m*, 28*m* in FIG. 1), along with the distributed parasitic capacitance coupled to the lines, introduces a fundamental limit on how fast a step function of driving signals can propagate across the panel and settle to their steady state. Generally, the voltage on such lines is changed according to a time-dependent function proportional to $1-\exp(-t/RC)$, where R is the total effective resistance between the source of the voltage change and the point of interest and C is the total effective capacitance between the source of the voltage change and the point of interest. This fundamental limit prevents large area panels to be refreshed at higher rates if proper compensation techniques are not provided. On the other hand, while one can use longer refresh time for factory calibration to eliminate the effect of imperfect settling, the calibration time will increase significantly resulting in longer Takt time or cycle time (i.e., less efficient production).

A method for characterizing and eliminating (or at least suppressing) the effect of propagation delay on data lines 22 and monitor lines 28 of AMOLED panels is disclosed herein. A similar technique can be utilized to cancel the effect of incomplete settling of select lines (e.g., the lines 24*j*, 24*n* in FIG. 1) that control the write and read switches of pixels on a row.

FIG. 2 is a circuit diagram of an RC model of data and monitor lines in a display system. A single column of a display panel is shown for simplicity. The data line (labeled "Data Line") can be equivalent to any of the data lines 22*i*, 22*m* in FIG. 1. The monitor line (labeled "Monitor Line") can be equivalent to any of the monitor lines 28*i*, 28*m* in FIG. 1. Here the panel has an integer number, N, rows where N is 1080 in a FHD or 2160 in a UHD panel, or another number corresponding to the number of rows in the display panel 20 of FIG. 1. The Data and Monitor lines are modeled with N cascaded RC elements. Each node of the RC network is connected to a pixel circuit as shown in FIG. 2. In a typical design the lumped sum of $R_p$ and $C_p$ are close to 10 kΩ and 500 pF, respectively. The settling time required for 10-bit accuracy (e.g., such as to achieve 0.1% error) for such a panel can be close to 150, whereas the row time (e.g., the time interval available for programming a single row between successive frames) in FHD and UHD panels running at 120 Hz are roughly 8 μS and 4 μS, respectively.

The required settling time for each row is proportional to its physical distance from the data or source driver 4 as shown in FIG. 2. In other words, the farther away a pixel 10 is physically located from the source driver 4, the longer it takes for the drive signal to propagate and settle on the corresponding row of the pixel 100. Accordingly, row N has the largest settling time constant, whereas row 1 (which is physically closest to the source driver 4) has the fastest. This effect is shown in the examples plotted in FIGS. 3A-3C, which are discussed next. During programming for a particular row, a write transistor 208 (e.g., the transistors 208 in FIG. 2 whose gates are connected to the "WR" line) in that row is turned on so as to connect the respective capacitor 200 of the pixel circuit 10 to the data line 22.

Figure 3A:
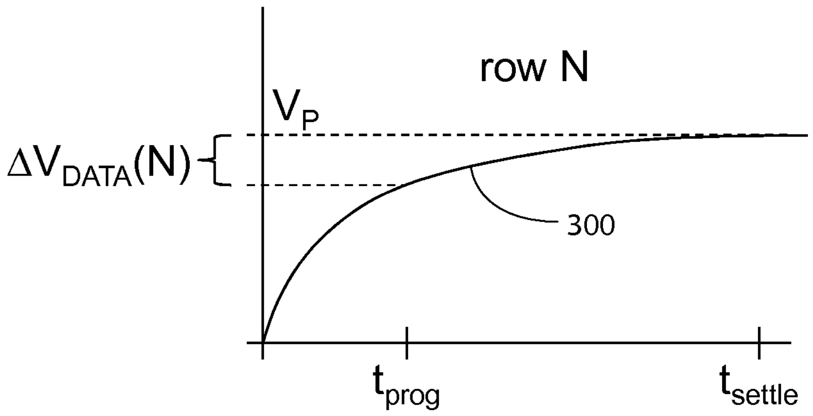
FIG. 3A is an illustrative plot of voltage versus time for programming a pixel showing the settling effects for the pixel in the Nth row in FIG. 2.
Figure 3B:
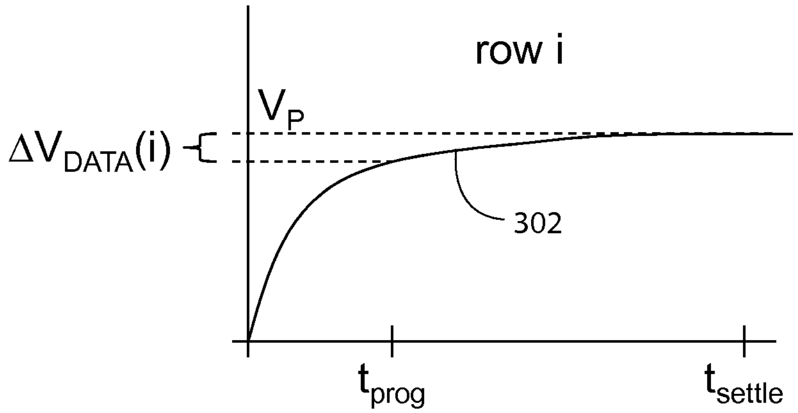
FIG. 3B is an illustrative plot of voltage versus time for programming a pixel showing the settling effects for the pixel in the ith row in FIG. 2.
Figure 3C:
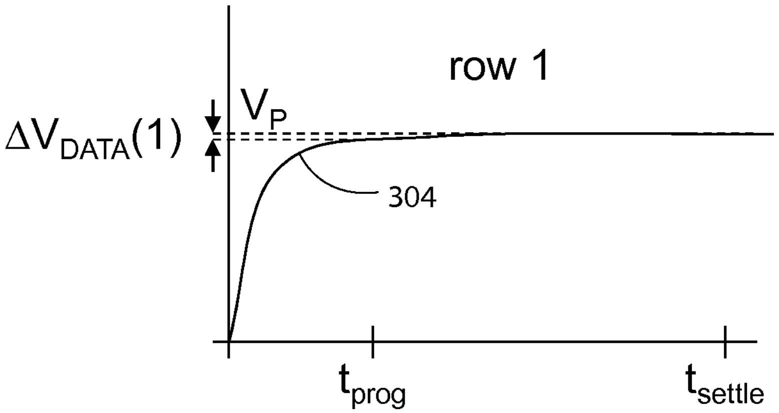
FIG. 3C is an illustrative plot of voltage versus time for programming a pixel showing the settling effects for the pixel in the 1st row in FIG. 2.

FIG. 3A is an illustrative plot 300 of voltage versus time for programming a pixel 10 showing the settling effects for the pixel in the Nth row in FIG. 2. FIG. 3B is an illustrative plot 302 of voltage versus time for programming a pixel 10 showing the settling effects for the pixel in the ith row in FIG. 2. FIG. 3C is an illustrative plot 304 of voltage versus time for programming a pixel 10 showing the settling effects for the pixel in the 1st row in FIG. 2. In each of FIGS. 3A-3C, a programming voltage $V_p$ is applied on the data line 22, while the respective pixel circuits 10 are selected for programming (e.g., by activating the respective "WR" lines for the Nth, ith, and 1st row circuits) and are charged according to the time-dependent parameter $1-\exp(-t/RC)$, where RC is the product of the total effective resistance and capacitance at each pixel circuit 10. Due to the difference in the total effective resistance and capacitance at different points on the data line 22, the $1^{st}$ row charges the most rapidly, whereas the Nth row charges the slowest. Thus, at the end of the programming duration ("$t_{prog}$") the Nth pixel reaches a value $V_p-\Delta V_{DATA}(N)$, while the ith row reaches a value $V_p-\Delta V_{DATA}(i)$, and the first row reaches a value $V_p-\Delta V_{DATA}(1)$. As shown in FIGS. 3A-3C, $\Delta V_{DATA}(1)$ is generally a smaller value than $\Delta V_{DATA}(N)$. FIGS. 3A-3C also illustrate the settlement time $t_{settle}$, which is a time to achieve a voltage on the storage capacitor 200 that is at or near the programmed voltage.

However, the corresponding time constant (e.g., RC value) of each row is not a linear function of the row number (row number is a linear representation for row distance from the source driver 4). Given this phenomenon, variation of fabrication process, which randomly affects $R_p$ and $C_p$, along with nonuniformity of the OLED (e.g., the light emitting devices 204) and the drive TFT 202, make it practically impossible to predict the accurate behavior of the data lines 22 and the monitor lines 28.

Thus, propagation delay on the data line 22 introduces an error to the desired voltage level that the storage device 200 in the pixel circuit 10 is programmed to. On the monitor line 28, however, the error is introduced to the current level of the TFT 202 or OLED 204 that is detected by the readout circuit 210 (e.g., such as in the monitoring system 12 of FIG. 1). Note that the readout circuit 210 can be on the same or opposite end of the source driver 4 side of the panel 50.

Figure 4A:
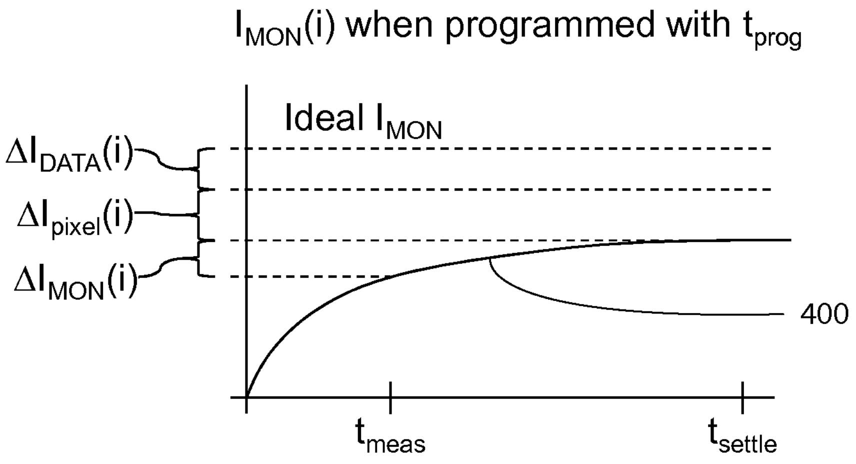
FIG. 4A is an illustrative plot of current versus time for reading a current from a pixel programmed with the operating programming duration influenced by settling effects.

FIG. 4A is an illustrative plot 400 of current versus time for reading a current using the readout circuit 210 from a pixel 10 programmed with the operating programming duration (timing budget) influenced by settling effects (e.g., the duration $t_{prog}$). The value of $I_{MON}$ is the current measured via the monitor line 28 (such as extracted via a current comparator that extracts the monitored current based on a comparison between the monitored current and a reference current, for example). Furthermore, in some embodiments, the monitor line 28 is employed to measure a voltage from the pixel circuit 10, such as the OLED 204 operation voltage, in which case the measured value can be $V_{MON}$, although the functional forms of FIGS. 4A and 4B extend to situations where voltages instead of currents are measured. FIG. 4A thus illustrates that the information extracted via the monitoring system 12 when the pixel circuit 10 is programmed during an interval with duration $t_{prog}$ and measured during an interval with duration $t_{meas}$ is offset from the ideal monitored value. The ideal monitored value is the value predicted in the absence of line parasitics, and where pixel circuits 10 have no non-uniformities, degradation effects, hysteresis, etc. The amount of the offsets are indicated in FIG. 4A by $\Delta V_{DATA}$(i), $\Delta I_{pixel}$(i), and $\Delta I_{MON}$ (i). The value of $\Delta I_{DATA}$(i) corresponds to the value of $\Delta V_{DATA}$ (i) due to the parasitic effects of the data line 22 discussed in connection with FIGS. 3A-3C. The value of $\Delta I_{MON}$(i) is the corresponding offset in the monitored current due to the finite line capacitance C and resistance R that causes the current level on the monitor line 28 to adjust over time before settling at a steady value, such as occurs after the duration $t_{settle}$. However, due to timing budgets of enhanced resolution displays, $t_{meas}$ is generally less than $t_{settle}$, and therefore parasitic effects can influence the monitoring operation as well the programming operation. In addition, the value of $I_{MON}$(i) is influenced by the degradation and/or non-uniformity of the pixel circuit in the ith row (e.g., due to threshold voltage or mobility variations, temperature sensitivity, hysteresis, manufacturing effects, etc.), which is indicated by the $\Delta I_{pixel}$ (i). Thus, the effect of the propagation delay on the monitoring line can be extracted by comparing the value of $I_{MON}$(i) after the time $t_{meas}$ with the value of $I_{MON}$(i) after the time $t_{settle}$, and thereby determine the value of $\Delta I_{MON}$(i).

Figure 4B:
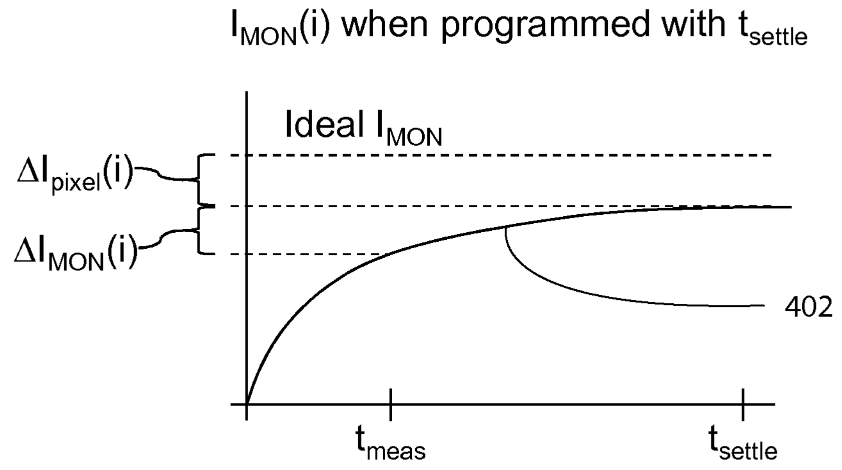
FIG. 4B is an illustrative plot of current versus time for reading a current from a pixel programmed with an extended programming duration not influenced by settling effects

FIG. 4B is an illustrative plot 402 of current versus time for reading a current from a pixel 10 programmed with an extended programming duration (longer than $t_{meas}$) sufficient to avoid settling effects, such as the time $t_{settle}$ shown in FIG. 3B. In FIG. 4B, the pixel is programmed during an interval with duration $t_{settle}$ such that the $\Delta I_{DATA}$(i) factor is substantially eliminated from the factors influencing the monitored voltage $I_{MON}$(i). Comparing the value of $I_{MON}$(i) while the pixel is programmed with duration $t_{prog}$ (as in FIG. 4A) with the value of $I_{MON}$(i) while the pixel is programmed with duration $t_{settle}$ thus allows for determination of the value $\Delta I_{DATA}$(i). Thus, aspects of the present disclosure provide for extracting non-uniformities and/or degradations of pixels 10 in a display 50 while accounting for parasitic effects in the data 22 and/or monitor line 28 that otherwise interfere with measurements of the pixel properties, such as by extending the programming timing budget to avoid propagation delay effects.

Figure 5:
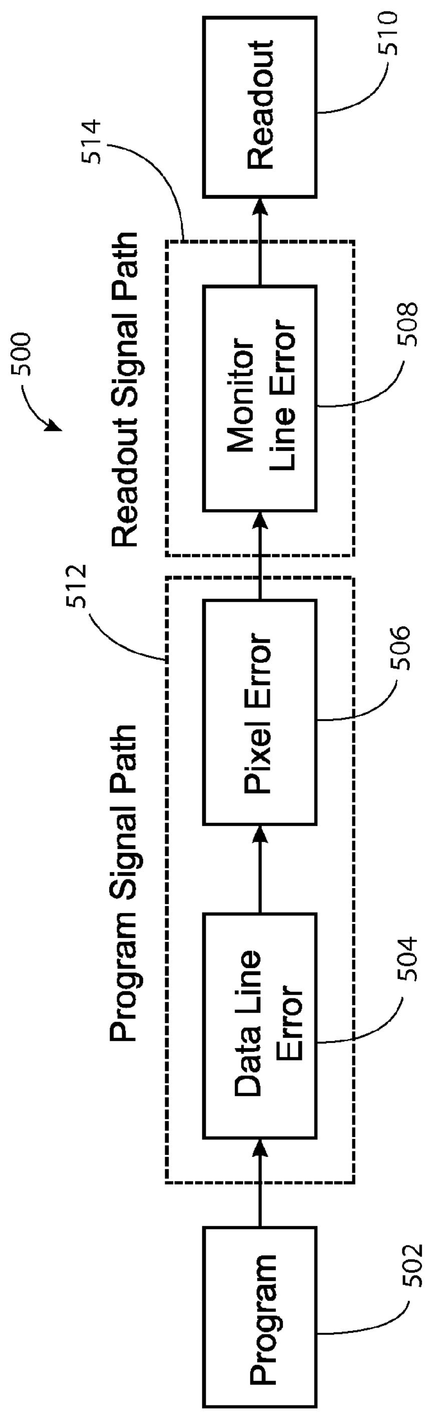
FIG. 5 illustrates accumulation of errors due to line propagation during programming and readout and also due to errors from pixel degradation.

FIG. 5 illustrates accumulation of errors due to line propagation during programming and readout and also due to errors from pixel degradation. FIG. 5 illustrates a sequence 500 of errors introduced along the signal path between programming through the data line 22 and readout of a pixel 10 through a monitor line 28. The source driver provides the desired signal level to the data line 22 to program a pixel 10 (502). Due to the limited available row-time during a program signal path 512, the voltage signal from the data line 22 does not completely settle at the pixel end (504). Consequently, the signal level that is sampled on storage device 200 ($C_S$) of the pixel 10 of interest is deviated from its nominal value. The pixel 10 itself introduces an error to the signal path 514 due to aging and random process variations of pixel devices 202, 204 (506). When the pixel 10 is accessed for readout through the monitor line 28, the delay of monitor line 28 within a row time also introduces an error to the extracted data (508). Thus, the accumulation of errors shown in FIG. 5 corresponds to the readout level at time $t_{meas}$ shown in FIG. 4A (510).

If the allocated time for readout is stretched or extended (e.g., to the duration $t_{settle}$), the amplitude of error can be detected by comparing the readout signal level (e.g., extracted from the readout circuit 210) to the signal level that is detected within the duration of a row time (e.g., the duration $t_{prog}$). The error introduced by the data line 22 propagation delay can be detected indirectly by stretching or extending the programming timing budget (e.g., to the duration $t_{settle}$) and observing the effect in the readout signal level (such as, for example, the scheme discussed in connection with FIG. 4B) using the readout circuit 210.

Figure 6:
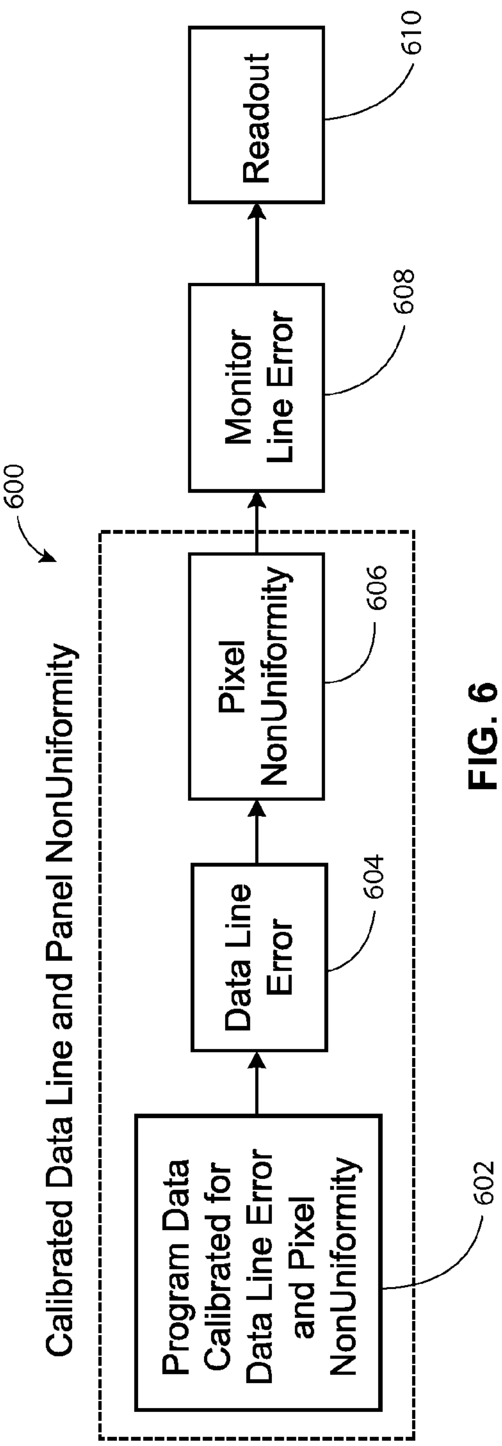
FIG. 6 illustrates an operation sequence where startup calibration data is utilized to characterize the monitor line effects.

FIG. 6 illustrates an operation sequence 600 where startup calibration data is utilized to characterize the monitor line 28 effects (602). To calibrate for the monitor line 28 delay effect, such delay can be extracted as follows. Few (but not necessarily all) pixels 10 at different positions in the columns are measured with a long enough time to avoid the settling issue referred to above (e.g., $t_{settle}$). Then, the currents drawn by those pixels 10 are measured (calibrated) within the required timing. The comparison of the two values for each pixel 10 provides the delay element associated with the monitor line 28 for the pixel 10 in that row. Using the extracted delays, the delay element is calculated for each pixel 10 in the column. Other columns in the display 50 can also be measured similarly.

The extracted delay shows itself as a gain in the pixel current detected by the measurement unit. To correct for this effect, the reference current can be scaled or the extracted calibration value for the pixel can be scaled accordingly, to account for the gain factor.

In FIG. 6, the delay caused by the monitor line 28 can be extracted as follows. The programming data put by the source driver 4 onto the data line 22 is calibrated for data line error and pixel non-uniformity (602). During programming of the pixels 10, the data line 22 introduces an error, e.g., $\Delta I_{DATA}$ shown in FIG. 4A) (604), and the random pixel non-uniformity discussed above contributes an error as well, e.g., $\Delta I_{pixel}$ shown in FIG. 4A) (606). When programming completes and the monitor line 28 is activated to read the current from the pixel circuit 10, the monitor line 28 introduces an error (e.g., $\Delta I_{MON}$ shown in FIG. 4A) (608), and the accumulation of these three types of errors ($\Delta I_{DATA}$, $\Delta I_{pixel}$, and $\Delta I_{MON}$) is present in the signals from the pixel circuit 10 monitored by the readout circuit 210 (610).

Figure 7:
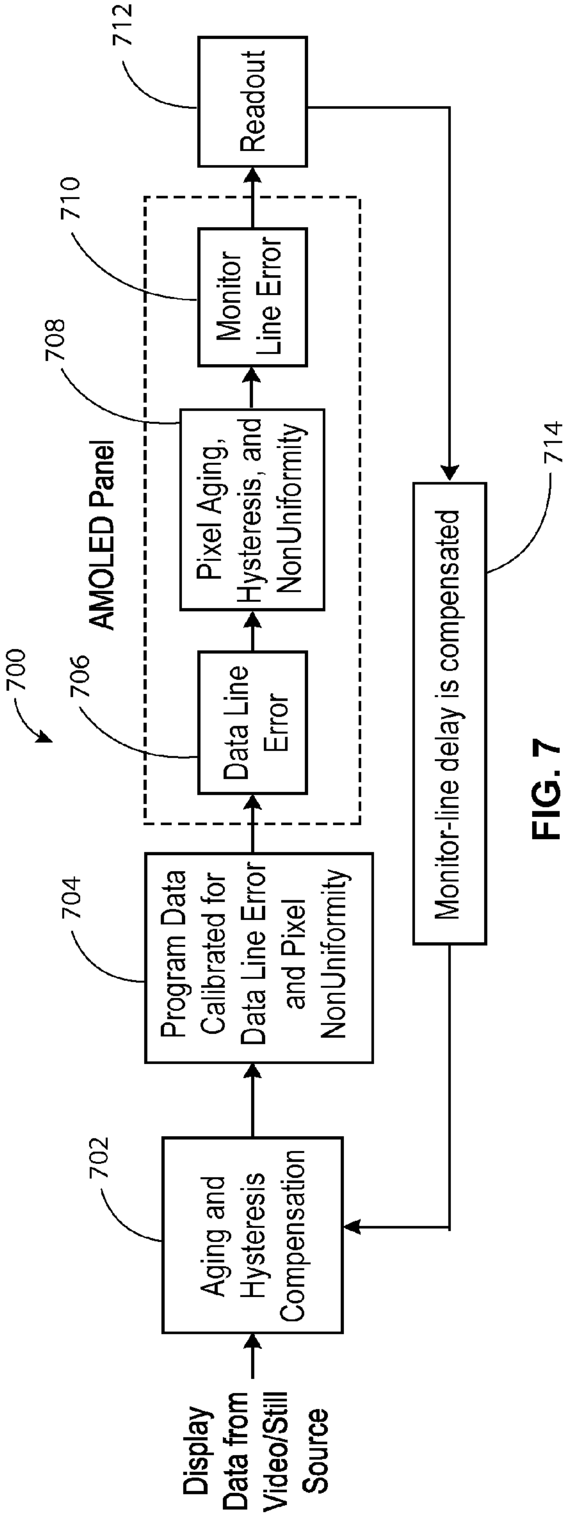
FIG. 7 illustrates an operation sequence where real-time measurements are utilized to provide calibration of pixel aging.

FIG. 7 illustrates an operation sequence where real-time measurements are utilized to provide calibration of pixel aging. The monitor line 28 error from FIG. 6 is used as a feedback to adjust an aging and hysteresis compensation before programming the pixels 10. In the system 700 shown in FIG. 7, the delays due to both the data line 22 and the monitor lines 28 are characterized and accounted for. The outputs from the monitoring system 12 are compensated and passed to the controller 2 (or the controller 2 performs any compensation after receiving the outputs), which dynamically determines, based on the output from the monitoring system 12, any adjustments to programming voltages for an incoming source of video or still display data to account for the determined time-dependent characteristics of the display 50. Aging and hysteresis of the display data are compensated (702), and the programming data for the pixels 10 is calibrated to account for both data 22 line error and pixel non-uniformity (704). During programming, the data line 22 introduces an error as described above (e.g., $\Delta I_{DATA}$ shown in FIG. 4A) (706), and pixel aging, hysteresis, and non-uniformity (e.g., $\Delta I_{pixel}$ shown in FIG. 4A) further degrades the current measurement reading of the pixel circuit 10 (708). The monitor line 28 introduces an error (e.g., $\Delta I_{MON}$ shown in FIG. 4A) (710), and the resultant signal with the accumulation of errors (contributed by $\Delta I_{DATA}$, $\Delta I_{pixel}$, and $\Delta I_{MON}$) is read by the readout circuit 210 (712) at the time $t_{meas}$ shown in FIG. 4A. The monitoring system 12 compensates for the delay in the monitor line 28 (714) as a feedback to compensating for the aging and hysteresis.

Figure 8:
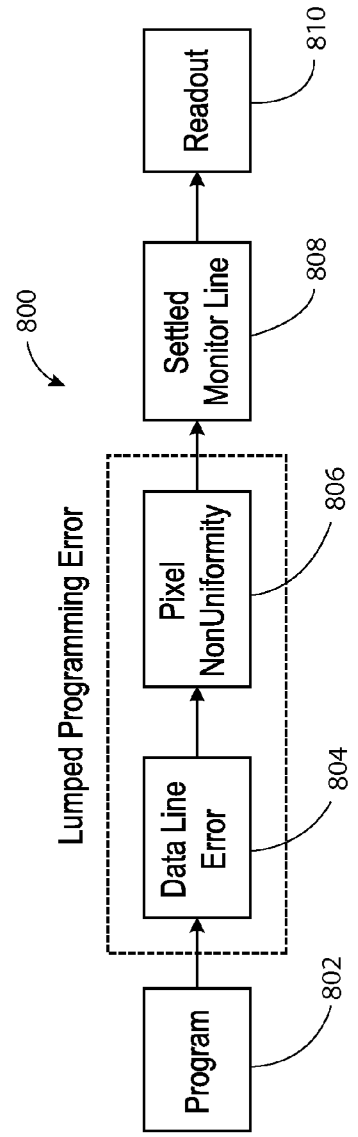
FIG. 8 illustrates isolation of the initial errors in the programming path early in the operating lifetime of a display.

FIG. 8 illustrates an operation sequence 800 for isolating the initial errors in the programming path early in the operating lifetime of a display. In order to characterize the propagation delay of the data lines 22 and monitor lines 28, the programming error and the readout error are isolated as illustrated in FIG. 8. The error contributed by the propagation delay of the data line 22 ($\Delta I_{DATA}$) and the error introduced by the initial non-uniformity of the panel ($\Delta I_{pixel}$) can be lumped together and be considered as one source of error.

The lumped programming error is characterized by running an initial (factory) calibration at the beginning of the panel life-time, i.e. before the panel 50 is aged. At that stage in the life-time of the panel, the effects of time-dependent pixel degradation are minimal, but pixel non-uniformity (due to manufacturing processes, panel layout characteristics, etc.) can still be characterized as part of the initial lumped programming errors.

In some examples, the timing budget allocated for avoiding the settling effects can be set to different values depending on the row of the display. For example, the value of $t_{settle}$ referred to in reference to FIGS. 3A-3C as the duration required to provide a programming voltage substantially not influenced by the propagation delay effects can be set to a smaller duration for the first row than the Nth row, because the settling time constant (e.g., the product of the effective resistance and effective capacitance) is generally greater at higher row numbers from the source driver. In another example, the value of $t_{settle}$ referred to in reference to FIGS. 4A-4B as the duration required to read out or measure a current on the monitor line 28 that is substantially not influenced by the propagation delay effects can be set to a smaller duration for the 1st row than the Nth row, because the settling time constant (e.g., the product of the effective resistance and effective capacitance) is generally greater at higher row numbers from the row closest to the current monitoring system 12.

Figure 9:
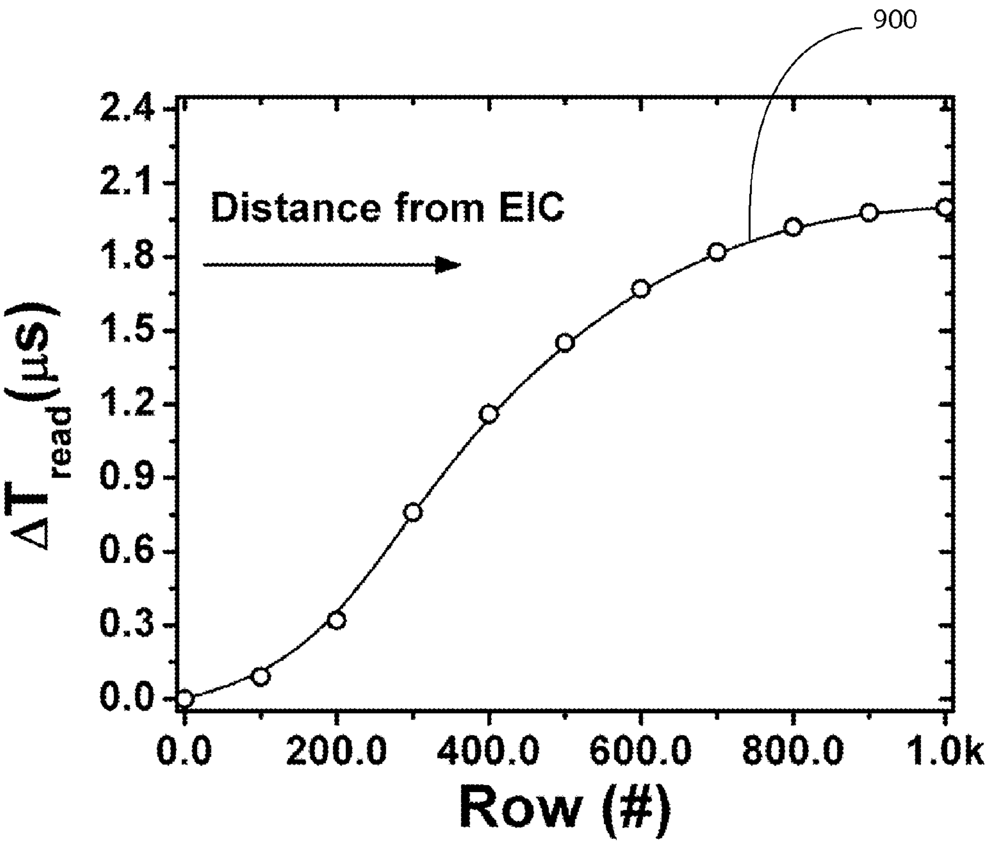
FIG. 9 provides an exemplary graph of read out time durations required to substantially avoid settling effects for each row in a display.

FIG. 9 provides an exemplary graph of readout time durations required to substantially avoid settling effects for each row in a display having 1024 rows. In the exemplary graph of FIG. 9, the circles indicate measured and/or simulated points for a subset of rows in the display (for example, pixels in rows 1, 101, 201, 301, 401, 501, 601, 701, 801, 901, and 1001 can be sampled to provide a representative subset of pixels across the entire display 50). Once the timing budget to avoid settling for the pixels in the representative subset is extracted, the timing budgets of the remaining rows can be calculated from the values for the subset (e.g., interpolated). As shown in FIG. 2, the effective resistance (R) and effective capacitance (C) of the monitor (data) line 22, 28 is approximately linearly related to row number from the current monitoring system 12 (source driver 4) as the resistance and capacitance of the lines can be approximately modeled as a series of series connected resistors and parallel connected capacitors. Thus, if a pixel is located in a row further from the current monitoring system 12, more time can be allocated for readout measurements (monitoring timing budget) to avoid settling effects than for a pixel located closer to the current monitoring system 12.

As shown in FIG. 9, the rows nearest the current monitoring system 12 (e.g., rows 1-100) are relatively unaffected by the settling effects and accordingly require comparatively low readout or monitoring timing budgets to substantially avoid settling effects. At intermediate rows (e.g., rows 200-400) the required monitoring timing budget is relatively sensitive to row number as the settling effects due to the effective resistance and capacitance across the rows of the display become significant and relative changes (e.g., from 200 to 400) translate to relatively large comparative differences in the settling constant. By contrast, the rows furthest from the current monitoring system 12 (e.g., rows 900-1000) require still more time (i.e., a greater monitoring timing budget) to avoid the settling effects, but are comparatively insensitive to row number as the effective resistance (R) and capacitance (C) is dominated by the accumulated resistance and capacitance and incremental changes (e.g., from 800 to 1000) do not translate to large comparative differences in the settling constant.

Thus, some embodiments employ differential or varied timing budgets that are specific to each row, rather than providing a constant or fixed timing budget of for example, 3 or 4 microseconds, which would be sufficient to avoid settling effects at all rows. By providing differential or adjustable timing budgets on a row-by-row basis or a subset of rows basis, the overall processing time for calibration, whether during initial factory calibration of the signal lines and/or initial pixel non-uniformities or during calibration of the monitor line effects, is significantly reduced, thereby providing greater processing and/or operating efficiency.

Thus some embodiments generally provide for reducing the effects of settling time by allocating readout or monitoring timing and/or programming timing budgets to the pixels 10 according to their position in a column (e.g., according to their row number and/or physical distance from the monitor and/or source driver 4, 12). The schemes described above can be employed to extract the line propagation delay settling characteristics by comparing measurements during typical programming budgets with measurements during timing budgets sufficient for each row to achieve settling (and the timing can be set according to pixel position). Furthermore, according to the line settling characteristics, the readout (or monitoring) time can be extracted for each pixel 10.

Figure 10:
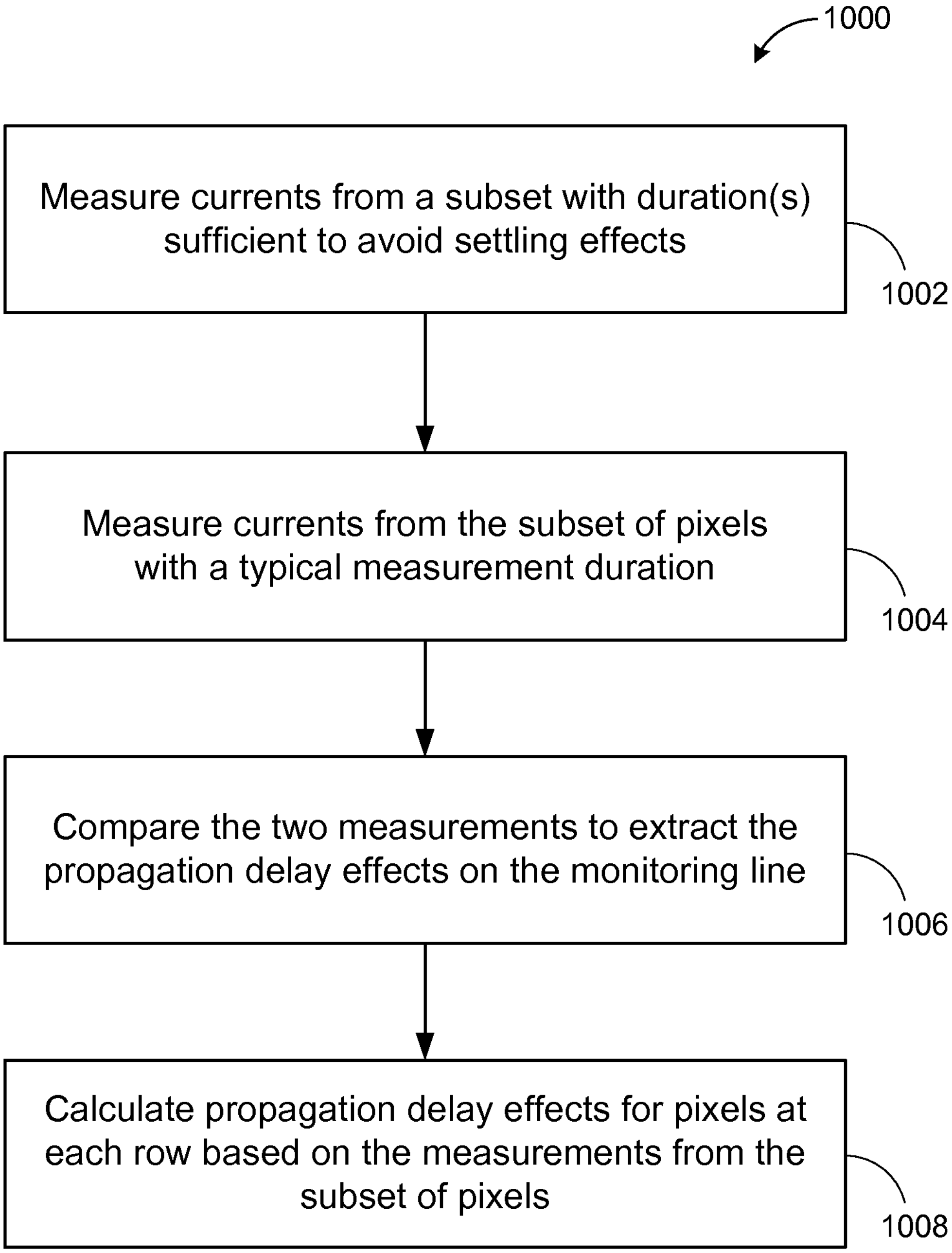
FIG. 10 is a flowchart of an embodiment for extracting the propagation delay effects on the monitoring line.

FIG. 10 is a flowchart 1000 of an exemplary embodiment for extracting the propagation delay effects on the monitoring line 28. A representative subset of pixels is programmed and the currents through those pixels are monitored via the monitor line 28. The measurements are taken during periods (fixed or varied monitoring timing budget) with a duration (or durations) sufficient to avoid settling effects on the monitoring line 28 (e.g., $t_{settle}$) (1002). The periods can have durations set according to row position of the measured pixel as described generally in connection with FIG. 9. The subset of pixels is then programmed with the same values and the currents through those pixels are monitored via the monitor line 28, but with durations (timing budgets) typically afforded for feedback measurements, rather than durations like $t_{settle}$ sufficient to avoid settling effects (1004). The two measurements are compared to extract the effect of the propagation delay effect on the monitoring line 28 (column) (1006). In some examples, the ratio of the two current measurements can be determined to provide a gain factor for use in scaling future current measurements. Because the propagation effects generally vary across the panel 50 in a predictable manner according to the effective resistance and capacitance of the monitor line 28 at each pixel readout location, which generally accumulates linearly with increasing row separation from the monitor, the effective propagation delay is calculated (e.g., interpolated) from the representative subset.

Figure 11:
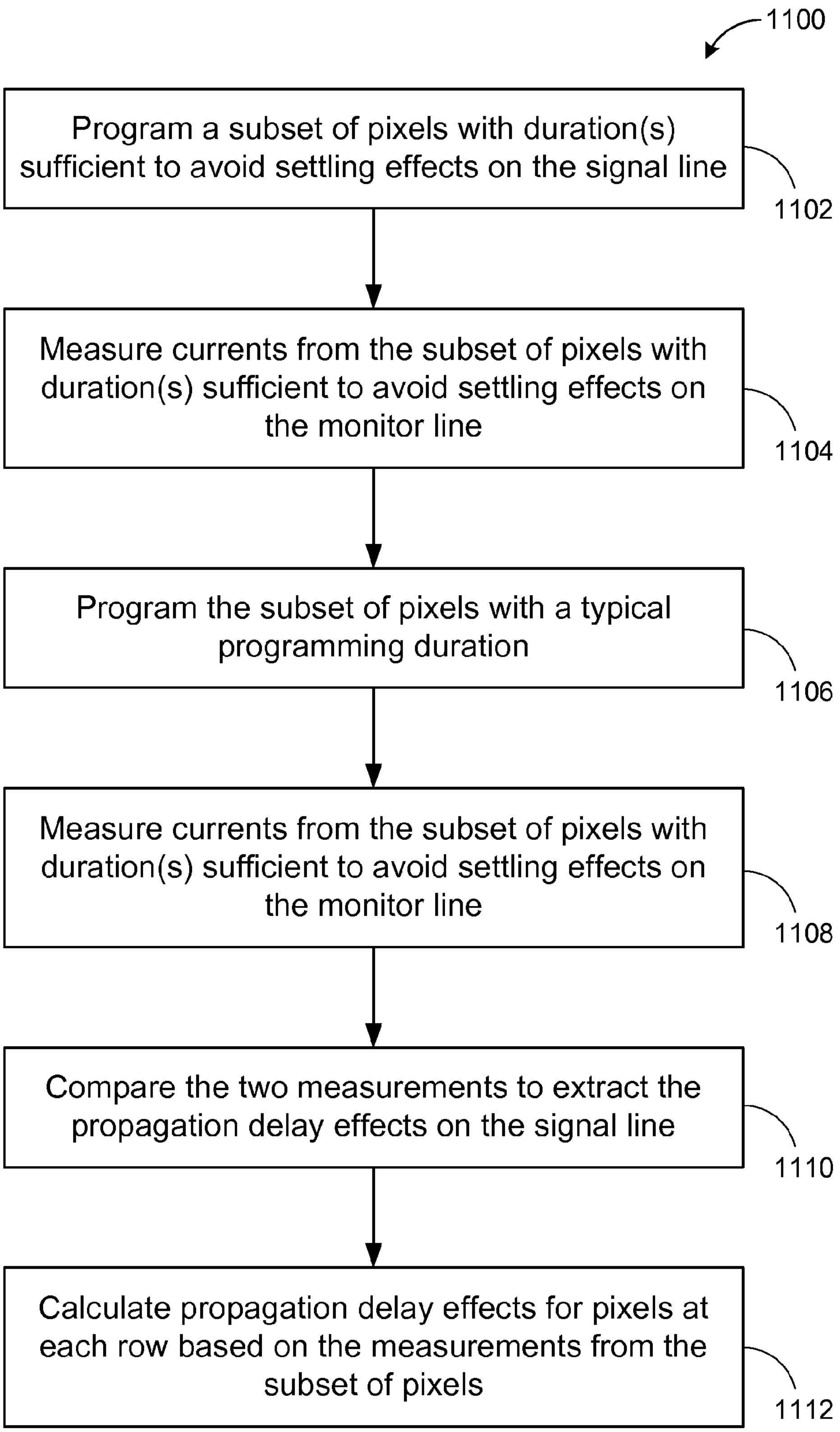
FIG. 11 is a flowchart of an embodiment for extracting the propagation delay effects on the signal line.

FIG. 11 is a flowchart 1100 of an embodiment for extracting the propagation delay effects on the signal line (e.g., the signal line or path comprising the data line 22, the pixel circuit 10, and the monitoring line 28). A representative subset of pixels is programmed with programming intervals or timing budgets sufficient to avoid settling effects (1102), and the currents through those subset of pixels are monitored via the monitoring line 28 by the readout circuit 210 (1104). The programming intervals or timing budgets can each be set according to the respective row position of the programmed pixels, such that the programming intervals vary as a function of the physical distance of the pixel 10 from the readout circuit 210. The measurements are taken during periods (fixed or varied monitoring timing budget) with a duration (or durations) sufficient to avoid settling effects on the monitoring line 28 (1104). The periods or timing budgets can have durations set according to row position of the measured pixel as described generally in connection with FIG. 9. The offset, if any, from the predicted ideal current value corresponding to the provided programming value is not due to propagation delay effects in either the signal line or the monitoring line and therefore indicates pixel non-uniformity effects (e.g., drive transistor non-uniformities, threshold voltage shift, mobility variations, such as due to temperature, mechanical stress, etc.).

The subset of pixels is then programmed according to the same programming values, but during programming intervals equal to a typical programming timing budget (1106). The currents through the subset of pixels are then measured via the monitor line 28 by the readout circuit 210, again during duration(s) (fixed or varied monitoring timing budgets) sufficient to avoid settling effects (1108). The two measurements are compared to extract the propagation delay effect on the signal line (1110). In some examples, the extracted propagation delay effects for the subset of pixels are used to calculate the propagation delay effects for the subset of pixels at each row based on the respective measurements of each of the subset of pixels (1112). In some examples, the measurement scheme 1100 is repeated for each pixel in the display to detect non-uniformities across the display 50. In some examples, the extraction of the propagation delay effects on the signal line 22, 10, 28 can be performed during an initial factory calibration, and the information can be stored (in the memory 6, for example) for use in future operation of the display 50.

In some examples, the readout operations to extract pixel aging information, for example, can be employed during non-active frame times. For example, readout can be provided during black frames (e.g., reset frames, blanking frames, etc.) inserted between active frames to increase motion perception (by decrease blurring), during display standby times while the display is not driven to display an image, during initial startup and/or turn off sequences for the display, etc.

While the driving circuits illustrated in FIG. 2 are illustrated with n-type transistors, which can be thin-film transistors and can be formed from amorphous silicon, the driving circuit illustrated in FIG. 2 can be extended to a complementary circuit having one or more p-type transistors and having transistors other than thin film transistors.

Circuits disclosed herein generally refer to circuit components being connected or coupled to one another. In many instances, the connections referred to are made via direct connections, i.e., with no circuit elements between the connection points other than conductive lines. Although not always explicitly mentioned, such connections can be made by conductive channels defined on substrates of a display panel such as by conductive transparent oxides deposited between the various connection points. Indium tin oxide is one such conductive transparent oxide. In some instances, the components that are coupled and/or connected may be coupled via capacitive coupling between the points of connection, such that the points of connection are connected in series through a capacitive element. While not directly connected, such capacitively coupled connections still allow the points of connection to influence one another via changes in voltage which are reflected at the other point of connection via the capacitive coupling effects and without a DC bias.

Furthermore, in some instances, the various connections and couplings described herein can be achieved through non-direct connections, with another circuit element between the two points of connection. Generally, the one or more circuit element disposed between the points of connection can be a diode, a resistor, a transistor, a switch, etc. Where connections are non-direct, the voltage and/or current between the two points of connection are sufficiently related, via the connecting circuit elements, to be related such that the two points of connection can influence each another (via voltage changes, current changes, etc.) while still achieving substantially the same functions as described herein. In some examples, voltages and/or current levels may be adjusted to account for additional circuit elements providing non-direct connections, as can be appreciated by individuals skilled in the art of circuit design.

Two or more computing systems or devices may be substituted for any one of the controllers described herein (e.g., the controller 2 of FIG. 1). Accordingly, principles and advantages of distributed processing, such as redundancy, replication, and the like, also can be implemented, as desired, to increase the robustness and performance of controllers described herein.

The operation of the example determination methods and processes described herein may be performed by machine readable instructions. In these examples, the machine readable instructions comprise an algorithm for execution by: (a) a processor, (b) a controller, such as the controller 2, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the baseline data determination methods could be implemented by software, hardware, and/or firmware. Also, some or all of the machine readable instructions represented may be implemented manually.

While particular embodiments and applications of the present disclosure have been illustrated and described, it is to be understood that the disclosure is not limited to the precise construction and compositions disclosed herein and that various modifications, changes, and variations can be apparent from the foregoing descriptions without departing from the spirit and scope of the invention as defined in the appended claims.

What is claimed is:

1. A display system comprising:

a pixel circuit including a light emitting device and a driving transistor for driving current through the light emitting device according to a driving voltage across the driving transistor, the pixel circuit further including one or more switch transistors arranged to selectively connect the pixel circuit to a signal line and a monitoring line;

a driver for programming the pixel circuit with the driving voltage via the signal line;

a monitor for measuring a current through the driving transistor via the monitoring line; and a controller for operating the driver and the monitor, the controller being configured to:

measure a first current through the drive transistor, via the monitor, for a duration sufficient for the current on the monitoring line to settle at a steady value and thereby avoid propagation delay effects of the monitoring line;

measure a second current through the drive transistor, via the monitor, for a duration provided for a monitoring timing budget of the display; and compare the measured first and second currents to extract the propagation delay effects of the monitoring line for the pixel.

2. The display system according to claim 1, wherein the controller is further configured to:

determine a gain factor associated with current measured from the pixel circuit based on a ratio of the measured first and second current values; and scale a subsequent current measurement according to the determined gain factor so as to account for the propagation delay effects of the monitoring line.

3. The display system according to claim 1, wherein the display system comprises an array of pixel circuits arranged in rows and columns, and wherein the controller is further configured to repeat the measurement and comparison for a representative subset of the pixels in the display so as to characterize the propagation delay effects of the monitoring line at a range of line distances from the monitor.

4. The display system according to claim 1, wherein the controller is further configured to:

program the pixel circuit, via the driver, for a duration sufficient for the applied voltage to settle at a steady value on the signal line and thereby avoid propagation delay effects of the signal line;

measure a third current through the drive transistor, via the monitor;

program the pixel circuit, via the driver, for a duration provided for a programming timing budget of the display;

measure a fourth current through the drive transistor, via the monitor;

compare the third and fourth current values to extract the propagation delay effects of the signal line for the pixel.

5. The display system according to claim 4, wherein the display system comprises an array of pixel circuits arranged in rows and columns, and wherein the controller is further configured to repeat the program operations, the measurement operations, and the comparison for a representative subset of the pixels in the display so as to characterize the propagation delay effects of the signal line at a range of line distances from the driver.

6. The display system according to claim 1, wherein the controller is further configured to:

determine a time-dependent parameter of the driving transistor by measuring current through the driving transistor, while accounting for the propagation delay effects of the monitoring line; and adjust a subsequent programming value according to the determined time-dependent parameter.

7. A method of characterizing propagation delay effects in a display system including a pixel circuit having a light emitting device driven by a driving transistor, the pixel circuit connected to a signal line for providing programming voltages to the pixel circuit for influencing the current through the driving transistor and a monitor line for measuring current levels through the driving transistor, the method comprising:

measuring a first current through the drive transistor, via the monitor, for a duration sufficient for the current to settle at a steady value and thereby avoid propagation delay effects of the monitoring line;

measuring a second current through the drive transistor, via the monitor, for a duration provided for a monitoring timing budget of the display; and comparing the first and second current to extract the propagation delay effect of the monitor line for the pixel circuit.

8. The method according to claim 7, further comprising:

receiving a data input indicative of an amount of luminance to be emitted from the light emitting device; and determining an adjustment to at least one of programming the display via the driver or the measuring based on the determined propagation delay effect such that the display system is operated substantially independent of line propagation delay effects.

9. The method according to claim 7, wherein the display system further includes a plurality of pixel circuits arranged in rows and columns, the method further comprising:

repeating the measuring and comparing for a subset of the pixel circuits in the display system so as to characterize the propagation delay effects of the monitor line at a range of line distances from the monitor.

10. A method of characterizing propagation delay effects in a display system including a pixel circuit having a light emitting device driven by a driving transistor, the pixel circuit connected to a signal line for providing programming voltages to the pixel circuit for influencing the current through the driving transistor and a monitor line for measuring current levels through the driving transistor, the method comprising:

programming the pixel circuit, via the driver, for a duration sufficient for an applied voltage to settle at a steady value on the signal line and thereby avoid propagation delay effects of the signal line;

measuring a first current through the driving transistor, via the monitor, responsive to the programming with the duration sufficient to avoid propagation delay effects;

programming the pixel circuit, via the driver, for a duration provided for a programming timing budget of the display;

measuring a second current through the driving transistor, via the monitor, responsive to the programming with the programming timing budget;

comparing the first and second current to extract the propagation delay effect of the signal line for the pixel circuit.

11. The method according to claim 10, further comprising:

receiving a data input indicative of an amount of luminance to be emitted from the light emitting device; and determining an adjustment to at least one of the programming or measuring based on the determined propagation delay effect such that the display system is operated substantially independent of line propagation delay effects.

12. The method according to claim 10, wherein the display system further includes a plurality of pixel circuits arranged in rows and columns, the method further comprising:

repeating the programming, measuring, and comparing for a subset of the pixel circuits in the display system so as to characterize the propagation delay effects of the signal line at a range of line distances from the driver.

* * * * *